(12) United States Patent
Kawai et al.

(10) Patent No.: US 8,511,025 B2
(45) Date of Patent: Aug. 20, 2013

(54) METAL JOINT AND BUILDING COMPRISING THE SAME

(75) Inventors: Yoshimichi Kawai, Tokyo (JP); Hiroshi Tanaka, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 362 days.

(21) Appl. No.: 12/735,113

(22) PCT Filed: Jan. 23, 2009

(86) PCT No.: PCT/JP2009/051120
§ 371 (c)(1),
(2), (4) Date: Jun. 16, 2010

(87) PCT Pub. No.: WO2009/093712
PCT Pub. Date: Jul. 30, 2009

(65) Prior Publication Data
US 2011/0107699 A1 May 12, 2011

(30) Foreign Application Priority Data

Jan. 24, 2008 (JP) .................................. 2008-014022
Jan. 24, 2008 (JP) .................................. 2008-014023

(51) Int. Cl.
*E04B 1/62* (2006.01)
*E04B 1/98* (2006.01)
*E04F 15/14* (2006.01)
*E04F 15/22* (2006.01)
*E04H 9/02* (2006.01)
*E04B 1/68* (2006.01)
*E02D 27/34* (2006.01)

(52) U.S. Cl.
CPC ................. *E04B 1/681* (2013.01); *E04F 15/22* (2013.01); *E04B 1/6803* (2013.01); *E04H 9/02* (2013.01); *E04H 9/028* (2013.01); *E02D 27/34* (2013.01)
USPC .......................................... 52/393; 52/167.1

(58) Field of Classification Search
USPC ............ 52/167.1, 167.3, 167.4, 167.7, 167.8, 52/223.1, 223.13, 223.14, 293.3, 195, 296, 52/298, 393, 396.04, 396.05, 396.06, 402, 52/481.1, 698, 702, 712, 714, 295
See application file for complete search history.

(56) References Cited

U.S. PATENT DOCUMENTS 4,452,019 A * 6/1984 Ikuo et al. .................... 52/167.1
4,959,934 A * 10/1990 Yamada et al. .............. 52/167.7
(Continued)

FOREIGN PATENT DOCUMENTS

JP 48-014144 2/1973
JP 48-14144 2/1973
(Continued)

OTHER PUBLICATIONS

English translation of the Detailed Description section for Japanese Publication 2006 283408A, translation completed on Oct. 15, 2012.*

(Continued)

*Primary Examiner* — Basil Katcheves
*Assistant Examiner* — Theodore Adamos
(74) *Attorney, Agent, or Firm* — Kenyon & Kenyon LLP

(57) ABSTRACT

A building including a metal joint is provided with a damping member that is mounted between at least a pair of structures and yields in accordance with relative displacement between the structures. The damping member includes strength-suppression device that suppresses an increase of strength after yield, and exerts a damping effect with rocking or expansion and contraction of at least one of the structures.

14 Claims, 31 Drawing Sheets

(56) References Cited

U.S. PATENT DOCUMENTS

| | | | | |
|---|---|---|---|---|
| 5,971,347 | A * | 10/1999 | Tsai et al. | 248/618 |
| 6,014,843 | A * | 1/2000 | Crumley et al. | 52/167.3 |
| 6,112,486 | A * | 9/2000 | Ashton et al. | 52/291 |
| 6,679,012 | B1 * | 1/2004 | Chen et al. | 52/167.7 |
| 6,715,258 | B1 * | 4/2004 | Mueller | 52/745.12 |
| 7,017,312 | B1 * | 3/2006 | Mueller | 52/295 |
| 7,516,582 | B2 * | 4/2009 | Leek | 52/223.1 |
| 7,712,282 | B2 * | 5/2010 | Robertson et al. | 52/712 |
| 7,856,765 | B1 * | 12/2010 | Su | 52/167.1 |
| 7,856,787 | B2 * | 12/2010 | Fujihashi et al. | 52/698 |
| 2002/0046514 | A1 * | 4/2002 | Leung | 52/167.3 |
| 2002/0066245 | A1 * | 6/2002 | Pryor | 52/293.3 |
| 2003/0230032 | A1 * | 12/2003 | Shahnazarian et al. | 52/167.3 |
| 2005/0257451 | A1 * | 11/2005 | Pryor et al. | 52/167.4 |
| 2006/0000167 | A1 * | 1/2006 | Nakaki et al. | 52/292 |
| 2006/0037256 | A1 * | 2/2006 | Pryor | 52/167.1 |

FOREIGN PATENT DOCUMENTS

| | | |
|---|---|---|
| JP | 62-240747 | 10/1987 |
| JP | 2-229367 | 9/1990 |
| JP | 5-93475 | 4/1993 |
| JP | 7-25160 | 5/1995 |
| JP | 7-025160 | 5/1995 |
| JP | 10-96337 | 4/1998 |
| JP | 10-253004 | 9/1998 |
| JP | 2001-207679 | 8/2001 |
| JP | 2003-184926 | 7/2003 |
| JP | 2004-092096 | 3/2004 |
| JP | 2005-90188 | 4/2005 |
| JP | 2006-214120 | 8/2006 |
| JP | 2006-283408 | 10/2006 |
| JP | 2007-217954 | 8/2007 |

OTHER PUBLICATIONS

International Search Report dated Mar. 10, 2009 issued in corresponding PCT Application No. PCT/JP2009/051120.

* cited by examiner

METAL JOINT AND BUILDING COMPRISING THE SAME

TECHNICAL FIELD

The present invention relates to a metal joint that exerts a damping effect in accordance with relative displacement between structures, and a building including the metal joint.

The present application is based on: Japanese Patent Application No. 2008-14022; and Japanese Patent Application No. 2008-14023, and the entire contents thereof are incorporated herein.

BACKGROUND ART

Conventionally, a bearing wall where a face member is fixed to a frame made of wood or section steel has generally been used in a building that is constructed by a wood frame construction method and has two-by-four construction, woody wall panel construction, light-gauge steel construction, or the like. Further, the building, which is constructed by a wood frame construction method, bears a horizontal force (external force), which is applied to the building by an earthquake or wind, as a shear force of the face member of the bearing wall. Accordingly, the horizontal strength of the entire building is secured.

Meanwhile, in the building using the bearing wall, a wall leg of the bearing wall of the lowest floor (first floor) is generally connected to an anchor bolt of a foundation by a hold-down hardware or the like. Further, the hold-down hardware or the anchor bolt is designed not to be broken when the bearing wall is bearing a horizontal force rocks. If the hold-down hardware or the anchor bolt is broken, the bearing wall is rotated due to the rocking. For this reason, the bearing wall can not bear a predetermined horizontal force. As a result, there is a problem in that the horizontal strength of the entire building is decreased. In contrast, since the bearing wall can secure relatively high horizontal strength but has high horizontal rigidity, input energy caused by an earthquake is increased. Accordingly, there is a demerit in that higher horizontal strength is needed.

Meanwhile, there has been proposed a damping structure of a column leg where a bending panel or a shear panel is provided between a foundation (base plate) and a column leg, at not the bearing wall but a column leg of a column in order to decrease input energy (for example, see Patent Document 1).

In the damping structure disclosed in Patent Document 1, one end of the bending panel or the shear panel is joined to the column leg by welding, and the other end thereof is joined to the base plate through a mounting plate (support plate). Further, when a tensile force is applied in a direction where the column rises due to an earthquake or the like, the bending yield of the bending panel or the shear yield of the shear panel occurs. Accordingly, a tensile force is absorbed.

[Patent Document 1] Japanese Unexamined Patent Application, First Publication No. 2004-92096

DISCLOSURE OF THE INVENTION

Problem that the Invention is to Solve

Meanwhile, in the damping structure disclosed in Patent Document 1, the column is connected to the base plate through the bending panel or the shear panel. Accordingly, the column and the base plate are not joined to each other, so that it is difficult to secure working accuracy when erecting the column and man hours are also required. In addition, since the bending panel or the shear panel is directly connected to the column leg, it is not possible to replace the panel after an earthquake or to replace the panel with a better panel. Further, there also is a problem in that and maintainability is inferior.

In the damping structure disclosed in Patent Document 1, a large space in which the bending panel or the shear panel is disposed is required around the column leg. For this reason, it is difficult to use the damping structure for the wall leg of the bearing wall of the building that is constructed by a wood frame construction method. In addition, if the panel disclosed in Patent Document 1 is joined to one side of the wall leg when the damping structure is used for the wall leg of the bearing wall, a reaction force is applied to the wall leg from the panel. For this reason, there is a concern that earthquake resisting performance deteriorates or cost is increased since the wall leg is broken or the wall leg does need to be reinforced.

Further, if the column and the base plate are connected to each other by the shear panel in the damping structure disclosed in Patent Document 1, the shear strength of the shear panel is gradually increased (work hardening) when a repeated load is applied to the shear panel of which the shear yield is to occur. In this case, a reaction force, which is applied to a welded portion of the shear panel and members provided around the welded portion, is increased.

That is, for example, if tensile (bending) yield occurs as shown in FIG. 30A, true stress is increased but a sectional area is decreased (constant volume) (necking occurs). Accordingly, the increase of the strength of nominal stress is suppressed. In contrast, if pure shear occurs as shown in FIG. 30B, a sectional area is not changed. Accordingly, work hardening caused by the increase of true stress occurs on the entire cross section, and shear strength is increased after plastic deformation. For this reason, stress exceeding design shear strength is generated, and there is a possibility that the welded portion of the shear panel, the column, or the base plate is fractured. In addition, since rigidity is increased after the plastic deformation of the shear panel, there is also a possibility that energy input to an upper portion of the building exceeds a design value. In this case, a sufficient vibration-suppression effect may not be expected.

Further, in the damping structure in the related art, the column and the base plate are connected to each other through the shear panel as described above. Accordingly, it is difficult to secure working accuracy when erecting the column and man hours are also required. In addition, since the bending panel or the shear panel is directly connected to the column leg, it is not possible to replace the panel after an earthquake or to replace the panel with a better panel. Further, there also is a problem in that and maintainability is inferior.

The present invention has been made in consideration of the above-mentioned circumstances, and an object of the present invention is to provide a metal joint that can sufficiently exert a vibration-suppression effect for effectively absorbing energy of an earthquake and is excellent in mountability or maintainability, and a building including the metal joint.

Means for Solving the Problem

The present invention has employed the followings to solve the above-mentioned problems and achieve the object.

That is, (1) A building including a metal joint according to the present invention is provided with a damping member that is mounted between at least a pair of structures and yields in accordance with relative displacement between the structures. The damping member includes a strength-suppression device that suppresses an increase of strength after yield, and exerts a damping effect with rocking or expansion and contraction of at least one of the structures.

(2) The building including a metal joint disclosed in (1) may employ as follows: one of the structures is a building foundation and the other thereof is a wall leg of a bearing wall installed on the building foundation; the damping effect is exerted with the rocking of the bearing wall; the metal joint includes a first connecting part connected to an anchor member that is fixed to the building foundation and extends upward in a vertical direction, second connecting parts that are connected to the bearing wall, and the damping member that connects between the first connecting part and the second connecting parts; and when the rocking of the bearing wall occurs, the damping member is deformed in accordance with the relative displacement between the second connecting part that is moved together with the bearing wall and the first connecting part of which the movement is restricted by the anchor member, thereby exerting the damping effect.

According to the building including a metal joint, the second connecting parts are connected to the wall leg of the bearing wall, and the first connecting part is connected to the anchor member. Accordingly, the bearing wall and the building foundation are connected to each other by the metal joint. Therefore, even though other parts are not provided or specific working is not performed on the bearing wall or the building foundation, it is possible to install the metal joint. Further, since the damping members are disposed in the metal joint so as to connect the second connecting parts to the first connecting part, the damping members do not need to be joined to the bearing wall or the anchor member. For this reason, components of the bearing wall do not need to be modified or reinforced. Furthermore, the bearing wall or the metal joint can be easily installed, and workability may be improved. In addition, if the second connecting parts are separated from the wall leg and the first connecting part is separated from the anchor member, the metal joint is also separated. Accordingly, maintainability, such as check or replacement after an earthquake, may be improved.

(3) The building including a metal joint disclosed in (1) may employ as follows: one of the structures is a building foundation and the other thereof is a column installed on the building foundation; the damping effect is exerted with the rocking or rise of the column; the metal joint includes a first connecting part connected to an anchor member that is fixed to the building foundation and extends upward in a vertical direction, a second connecting part that is connected to the column, and the damping members that connects the first connecting part to the second connecting part; and when the rocking or rise of the column occurs, the damping members are deformed in accordance with the relative displacement between the second connecting part that is moved together with the column and the first connecting part of which the movement is restricted by the anchor member, thereby exerting the damping effect.

In this case, like when the metal joint is provided at the wall leg of the above-mentioned bearing wall, even though other parts are not provided or specific working is not performed on the column or the building foundation, it is possible to install the metal joint. Further, since the damping members do not need to be directly connected, the metal joint can be easily installed, workability may be improved, and maintainability, such as check or replacement after an earthquake, may be improved.

(4) The building including a metal joint disclosed in (1) may employ as follows: one of the structures is a first beam that includes a flange extending in a longitudinal direction thereof and the other thereof is a second beam that faces the first beam with the column interposed therebetween; the damping effect is exerted with an expansion and a contraction of the flange that are caused by the bending of at least one of the first and second beams; the metal joint includes a first connecting part that is connected to an anchor member fixed to an end of the second beam, a second connecting part that is connected to an end of the flange of the first beam, and the damping member that connects between the first connecting part and the second connecting parts; and when the first beam is bent, the damping member is deformed in accordance with the relative displacement between the second connecting part that is moved together with the flange and the first connecting part of which the movement is restricted by the anchor member, thereby exerting the damping effect.

(5) The building including a metal joint disclosed in (1) may employ as follows: one of the structures is a beam that includes a flange extending in a longitudinal direction thereof and the other thereof is a column; the metal joint includes a first connecting part that is connected to an anchor member fixed to the column, a second connecting part that is connected to an end of the flange of the beam, and the damping member that connects between the first connecting part and the second connecting part; and when the beam is bent, the damping member is deformed in accordance with the relative displacement between the second connecting part that is moved together with the flange and the first connecting part, thereby exerting the damping effect.

In this case, like when the metal joint is provided at the wall leg of the above-mentioned bearing wall, even though other parts are not provided or specific working is not performed at the end of the beam, it is possible to install the metal joint. Further, since the damping members do not need to be directly connected, the metal joint can be easily installed, workability may be improved, and maintainability, such as check or replacement after an earthquake, may be improved.

(6) The building including a metal joint disclosed in (1) may employ as follows: the structures are divided braces that are obtained by dividing a brace into several pieces; the metal joint includes a first connecting part that is connected to one of the divided braces, a second connecting part that is connected to an anchor member fixed to the other of the divided braces, and the damping member that connects between the first connecting part and the second connecting parts; and when the brace expands or contracts, the damping member is deformed in accordance with the relative displacement between the first connecting part that is moved together with one of the divided braces and the second connecting part of which the movement is restricted by the anchor member, thereby exerting the damping effect.

In this case, like when the metal joint is provided at the wall leg of the above-mentioned bearing wall, even though other parts are not provided or specific working is not performed on the brace joint portion, it is possible to install the metal joint. Further, since the damping members do not need to be directly connected, the metal joint can be easily installed, workability may be improved, and maintainability, such as check or replacement after an earthquake, may be improved.

(7) The building including a metal joint disclosed in (2) to (6) may employ as follows: the second connecting part makes a pair so as to face each other with the first connecting part interposed therebetween; and the damping member is disposed substantially symmetrically with respect to an axis of the anchor member.

(8) The building including a metal joint disclosed in (2) to (6) may employ as follows: the second connecting part makes a pair so as to be radially disposed around the first connecting part; and the damping member is disposed substantially point-symmetrically with respect to an axis of the anchor member.

(9) The building including a metal joint disclosed in (2) to (6) may employ as follows: the second connecting part is a pair of connecting steel plates; the connecting steel plates are disposed so as to face each other with the anchor member interposed therebetween; and the damping member is a damper steel plate that connects between the connecting steel plates and the first connecting part.

According to the construction, the second connecting parts (connecting steel plates) are disposed so as to make a pair or a set, and the damping members (damper steel plates) are disposed substantially point-symmetrically or substantially symmetrically with respect to an axis of the anchor member. Accordingly, stress, which is generated when the damping members are deformed in accordance with the relative displacement between the first and second connecting parts, is symmetrically applied without eccentricity. As a result, stress caused by the eccentricity may not be generated, or the stress caused by the eccentricity may be made extremely small. Therefore, reinforcement is not needed against load stress such as eccentric bending moment applied to the wall leg or column leg of the bearing wall, the end of the beam, the brace joint portion, and the like, or the degree of the reinforcement may be minimized, so that the increase of manufacturing cost of the structure may be prevented. In addition, since load stress is not generated, a force is smoothly transmitted between the anchor member and the bearing wall through the metal joint. As a result, the dynamic mechanism of the damping members becomes clear and a damping effect is reliably and appropriately exerted, so that vibration energy caused by an earthquake or the like may be effectively absorbed.

(10) The building including a metal joint disclosed in (9) may employ as follows: the first connecting part is a cylindrical steel member into which the anchor member is inserted; the damper steel plate is joined to the cylindrical steel member so as to extend from the peripheral surface of the cylindrical steel member in a radial direction of the cylindrical steel member; and the damper steel plate is disposed between each of the connecting steel plates and the cylindrical steel member.

(11) The building including a metal joint disclosed in (9) may employ as follows: the first connecting part is a cylindrical steel member into which the anchor member is inserted; the damper steel plate is joined to the cylindrical steel member so as to extend from the peripheral surface of the cylindrical steel member in a tangential direction of the cylindrical steel member; and the two damper steel plates are disposed between the connecting steel plates and the cylindrical steel member.

(12) The building including a metal joint disclosed in (9) may employ as follows: the two damper steel plates connects between the connecting steel plates, and face each other so as to be substantially parallel to each other; the first connecting part is formed of first and second edge connecting members that connect one edges and other edges of the damper steel plate, respectively; and insertion holes into which the anchor member is inserted are formed at the first and second edge connecting members.

According to the construction, an appropriate damper steel plate or first connecting part is selected depending on the specification of the building on which the metal joint is installed or the bearing wall that is an object on which the metal joint is installed. Accordingly, it is possible to increase options, such as the degree of the damping effect to be exerted and the mounting manner of the anchor member.

(13) The building including a metal joint disclosed in (9) may employ as follows: one edges and other edges of the connecting steel plates are connected to each other by first and second reinforcing steel members, respectively; and an insertion hole into which the anchor member is inserted is formed at at least one of the first and second reinforcing steel members.

In this case, a pair or set of connecting steel plates is connected to each other by the first and second reinforcing steel members. Accordingly, when stress is applied to the connecting steel plate from the damper steel plate, the first and second reinforcing steel members may prevent the deformation or movement of the connecting steel plate, that is, prevent a pair or set of connecting steel plates from being deformed to be inclined from an initial state. Therefore, a damping effect of the damper steel plate may be appropriately exerted. The anchor member is inserted into the insertion hole that is formed at at least one of the first and second reinforcing steel members, so that the eccentricity between the anchor member and the reinforcing steel members (the connecting steel plates and the damper steel plates) may not be generated and the generation of load stress caused by the eccentricity may be prevented.

(14) The building including a metal joint disclosed in (2) may employ as follows: the bearing wall includes, at least, a pair of frame members that is positioned at side edges of the bearing wall, and a face member that is fixed between the frame members; each of the frame members has a hollow cross section that has a pair of opposite faces facing each other; and the second connecting part is connected to each of the opposite faces.

In this case, the second connecting parts are connected to the pair of opposite faces of the frame members of the bearing wall (that is, the metal joint is installed in the hollow cross section of the frame member), so that the eccentricity between the metal joint and the frame member may be minimized. Accordingly, the stress applied to the frame member may be further decreased. In addition, the metal joint is installed in the hollow cross section of the frame member, so that the metal joint does not protrude from the bearing wall toward the outside and cause obstruction when being installed. Therefore, the degree of freedom may be improved in installing the bearing wall.

(15) The building including a metal joint disclosed in (14) may be a steel house where each of the frame members is made of light-gauge steel.

In this case, substantially the same effect as the above-mentioned building including a metal joint may be obtained, the degree of freedom may be improved in installing the metal joint and the bearing wall, and maintainability may be improved.

(16) A metal joint according to the present invention is mounted between a pair of structures. The metal joint is provided with: a first connecting part that is connected to one of the structures; a second connecting part that is connected to the other of the structures; and a damping member that is connected between the first connecting part and the second connecting parts. The damping member includes strength-suppression device that suppresses an increase of strength after yield, and exerts a damping effect in accordance with the relative displacement that is generated between the structures.

According to the metal joint, the damping member includes strength-suppression device. Accordingly, even though a repeated load is applied to the damping member after the yield of the damping member, the increase of the strength of the damping member may be suppressed and stress exceeding design strength is not generated. Therefore, the stress applied to the first and second connecting parts of the metal joint or the stress applied to the structures on which the metal joint is mounted does not exceed a design value, and the breakage of the parts or the structures may be prevented. In addition, since the increase of the rigidity of the damping member may be suppressed, a vibration-suppression effect expected from design may be obtained by a damping effect (energy-absorption effect) of the damping member without the increase of the input energy of an earthquake or the like.

Further, in the metal joint, the damping members are connected between the first and second connecting parts and the first and second connecting parts are connected to each of the set of structures. Accordingly, the damping member does not need to be directly connected to the structure. For this reason, as compared to the construction where the damping member is directly connected to the structure, the metal joint may be easily mounted and the mounting accuracy or mounting workability may be improved. In addition, if the first and second connecting parts are separated from the set of structures, the metal joint may also be separated. Accordingly, maintainability, such as check or replacement after an earthquake, may be improved.

(17) The metal joint disclosed in (16) may employ as follows: the first and second connecting parts are disposed at positions that face each other in a direction substantially orthogonal to a direction of the relative displacement generated between the structures; and assuming that a direction of the relative displacement is a first direction and a direction where the first and second connecting parts face each other is a second direction, the damping member is a damper steel plate that is provided substantially parallel to a virtual plane that includes the first and second directions.

(18) The metal joint disclosed in (17) may employ as follows: when the length of the damper steel plate in the first direction is seen in the second direction, the middle portion of the damper steel plate is shorter than both ends thereof, and a length of the both ends is set so that the bending yield of the both ends occurs when shear strength determined by the length of the middle portion is increased; and the strength-suppression device is formed by the shape of the damper steel plate.

According to the construction, in the metal joint, the damper steel plates, which are damping members, are disposed so as to be sheared in an in-plane direction by the relative displacement between a set of structures. The length of the middle portion of the damper steel plate is made small, shear strength is determined, and the shape of the damper steel plate is set so that the bending yield of both ends of the damper steel plate occurs due to the increase of the shear strength of the middle portion of the damper steel plate. Accordingly, the stress born by the damper steel plate may be made stable. That is, if bending (tensile) yield occurs as described above, true stress is increased but the increase of strength is suppressed. Accordingly, even though the shear strength is increased due to work hardening after the bending yield of both ends of the damper steel plate, bending strength is not increased and the damper steel plate is stable in a stress state (predetermined born shear force) where both ends are hinged at this bending strength.

(19) The metal joint disclosed in (17) may employ as follows: when the thickness of the damper steel plate is seen in the second direction, the middle portion of the damper steel plate is thinner than both ends thereof, and a thickness of the both ends is set so that the bending yield of the both ends occurs when shear strength determined by the thickness of the middle portion is increased; and the strength-suppression device is formed by the shape of the damper steel plate.

(20) The metal joint disclosed in (17) may employ as follows: when the length of the damper steel plate in the first direction is seen in the second direction, the middle portion of the damper steel plate is shorter than both ends thereof; when the thickness of the damper steel plate is seen in the second direction, the middle portion of the damper steel plate is thinner than both ends thereof; the length and thickness of the both ends are set so that the bending yield of the both ends occurs when shear strength determined by the length and thickness of the middle portion is increased; and the strength-suppression device is formed by the shape of the damper steel plate.

According to the construction, the bending yield of both ends of the damper steel plate may occur in accordance with the increase of the shear strength of the middle portion of the damper steel plate, and the stress born by the damper steel plate may be made stable.

(21) The metal joint disclosed in (17) may employ as follows: inclined portions, which are inclined from the both ends of the damper steel plate toward the middle portion, are formed at the both ends of the damper steel plate.

In this case, since the length of the damper steel plate is gradually decreased from both ends toward the middle portion due to the inclined portion, the smooth flow of stress may be formed in the damper steel plate. Accordingly, a plastic region after yield is widened, so that energy absorption performance and deformability may be improved.

(22) The metal joint disclosed in (17) may employ as follows: substantially rhombic notched hole is formed at the damper steel plate; and one of a pair of diagonal lines, which forms the rhombic shape, is parallel to the first direction and the other thereof is parallel to the second direction.

In this case, the damper steel plate may be divided by the substantially rhombic notched holes. Accordingly, the same stress state as described above is formed in each of the portions that are divided by the notched holes so as to have short length, over the entire length of the damper steel plate in the first direction. Accordingly, since a plurality of steel plate portions is disposed in parallel in one metal joint, it is possible to adjust the damping effect of the metal joint by appropriately changing the number of the portions while a stress-deformation relationship relating to the bending-shear of each portion is maintained. In addition, it is possible to suppress the deformation of the first and second connecting parts and structural members provided around the first and second connecting parts, by reducing the bending moment of each portion.

(23) The metal joint disclosed in (17) may employ as follows: one or more slits, which pass through the damper steel plate and extend in the second direction, are formed at the damper steel plate; the length of a divided steel plate portion, which is obtained by dividing the damper steel plate by the slits, is set so that the bending yield of both ends in the second direction occurs when the shear strength is increased; and the strength-suppression device is formed by the shape of the damper steel plate.

In this case, in the metal joint where the damper steel plates, which are damping members, are disposed so as to be sheared in an in-plane direction by the relative displacement between a set of structures, the length of each of the divide steel plate portions, which are divided by the slits, is set so that the bending yield of both ends occurs when the shear strength is increased. Accordingly, the stress born by the damper steel plate may be made stable. That is, a born shear force is stable in a stress state (predetermined born shear force) where the bending yield of both ends of each divide steel plate portion occurs and the both ends are hinged. Further, since a plurality of divide steel plate portions is disposed in parallel in one metal joint, it is possible to adjust the damping effect of the metal joint by appropriately changing the number of the divide steel plate portions while a stress-deformation relationship relating to the bending-shear of each portion is maintained. In addition, it is possible to suppress the deformation of the first and second connecting parts and structural members provided around the first and second connecting parts, by reducing the bending moment of each portion.

(24) The metal joint disclosed in (17) may employ as follows: the damper steel plate is formed of at least one of a steel member having a yield strength ratio where yield strength is equal to or higher than 2/3 of maximum strength, and a steel member having a yield strength range where yield strength is within ±20% of design yield strength; and the strength-suppression device is formed by the dynamic characteristic of the damper steel plate.

In this case, if a yield strength ratio is set to 2/3 or more or a yield strength range is set within ±20% as the dynamic characteristic of the damper steel plate that is a damping member, the stress born by the damper steel plate may be made stable.

(25) The metal joint disclosed in (17) may employ as follows: precipitation hardening is performed on the damper steel plate so that the damper steel plate satisfies at least one of a predetermined yield strength ratio and a predetermined yield strength range.

In this case, if plastic working is performed, it is possible to set a yield strength ratio or a yield strength range to a predetermined value. If this steel member is used as the damper steel plate, it is possible to suppress the increase of strength after shear yield.

(26) The metal joint disclosed in (17) may employ as follows: the damper steel plate is formed of a steel plate on which plastic working is performed, and the plastic working is to previously deform the steel plate from an initial position in the first direction by a predetermined amount of deformation, and to make the steel plate, where the yield has occurred, return to the initial position; and at least one of the yield strength ratio and the yield strength range of the damper steel plate is set to a predetermined value by the plastic working.

In this case, if precipitation hardening is performed, it is possible to set a yield strength ratio or a yield strength range to a predetermined value. If this steel member is used as the damper steel plate, it is possible to suppress the increase of strength after shear yield.

Further, the design strength of a general structural member used around the metal joint is equal to or lower than 2/3 of maximum strength. Accordingly, if the yield strength of the metal joint is set to 2/3 or more of the maximum strength, the yield of the metal joint may occur before the stress applied to the peripheral construction reaches the maximum strength. Likewise, if a yield strength range is set within ±20%, the yield of the metal joint may occur before the stress applied to the peripheral construction reaches the maximum strength.

(27) The metal joint disclosed in (17) may employ as follows: the second connecting parts include a pair of connecting members disposed at symmetrical positions between which the first connecting part is interposed; and a pair of the damper steel plates is substantially axisymmetrically disposed with the first connecting part interposed therebetween.

(28) The metal joint disclosed in (17) may employ as follows: the second connecting parts include a pair of connecting members disposed at positions, which are substantially symmetrical with respect to a point and between which the first connecting part is interposed; and a pair of the damper steel plates is substantially point-symmetrically disposed with the first connecting part interposed therebetween.

According to the construction, the connecting steel plates, which are second connecting parts, make a set and are symmetrically disposed with the first connecting part interposed therebetween. Further, the damper steel plates also make a set and are substantially axisymmetrically or point-symmetrically disposed with the first connecting part interposed therebetween. As a result, stress, which is generated when the damper steel plates are deformed, is symmetrically applied without eccentricity, so that the stress caused by the eccentricity may not be generated or the stress caused by the eccentricity may be made extremely small. Therefore, load stress such as eccentric bending moment may hardly be applied to the set of structures, and reinforcement is not needed against load stress or the degree of the reinforcement may be reduced. In addition, since load stress is not generated, a force is smoothly transmitted between the set of structures through the metal joint. Accordingly, the dynamic mechanism of the damper steel plate becomes clear and a damping effect is reliably and appropriately exerted, so that vibration energy caused by an earthquake or the like may be effectively absorbed.

Advantage of the Invention

According to the building including a metal joint disclosed in (1) or the like, it is possible to achieve a building that effectively absorb energy caused by an earthquake or the like and is economical and excellent in earthquake resistance. Further, degree of freedom is improved in installing the metal joint and reinforcement for members provided around the metal joint is reduced or omitted, so that the manufacturing cost may be reduced.

According to the metal joint disclosed in (16) or the like, it is possible to achieve a building that effectively absorb energy caused by an earthquake or the like and is economical and excellent in earthquake resistance, and to improve the mountability or maintainability of the metal joint.

DESCRIPTION OF REFERENCE NUMERALS AND SIGNS

1: BUILDING
2: BUILDING FOUNDATION
6: ANCHOR BOLT (ANCHOR MEMBER)
10: BEARING WALL
11: FRAME MEMBER
12: FACE MEMBER
14: FLANGE (OPPOSITE FACE)
20, 30, 40, 50, 60, 70, 80: METAL JOINT
21, 31: WALL CONNECTING STEEL PLATE (SECOND CONNECTING PART)
22, 32: UPPER REINFORCING STEEL MEMBER
22A, 32A: INSERTION HOLE
23, 33: LOWER REINFORCING STEEL MEMBER
23A, 33A: INSERTION HOLE
26, 36, 52, 65: CYLINDRICAL STEEL MEMBER (FIRST CONNECTING PART)
27, 37, 47, 54, 67: DAMPER STEEL PLATE (DAMPING MEMBER)
45: UPPER EDGE CONNECTING MEMBER (FIRST CONNECTING PART)
46: LOWER EDGE CONNECTING MEMBER (FIRST CONNECTING PART)
45A, 46A: INSERTION HOLE
45B, 46B, 47A, 53, 66: FIXING PIECE (SECOND CONNECTING PART)
51, 61, 71: COLUMN
62, 72: BEAM
63: COLUMN-BEAM JOINT PORTION
73: BRACE
74: BRACE JOINT PORTION
106: ANCHOR BOLT (ANCHOR MEMBER)
110: PERIPHERAL STRUCTURAL MEMBER (FRAME MEMBER)
120, 130, 140, 140A, 150, 160: METAL JOINT
121, 131, 141, 151: CONNECTING STEEL PLATE (SECOND CONNECTING PART)
125, 135, 145, 155: CYLINDRICAL STEEL MEMBER (FIRST CONNECTING PART)
126, 136, 146, 156, 166: DAMPER STEEL PLATE (DAMPING MEMBER)
126B, 136B: INCLINED PORTION
136C: NOTCHED HOLE
146B: SLIT
165: U-SHAPED STEEL MEMBER (FIRST CONNECTING PART)
166C: FIXING PIECE (SECOND CONNECTING PART)

BEST MODE FOR CARRYING OUT THE INVENTION

First Embodiment

A first embodiment of the present invention will be described below with reference to drawings.

Figure 1:
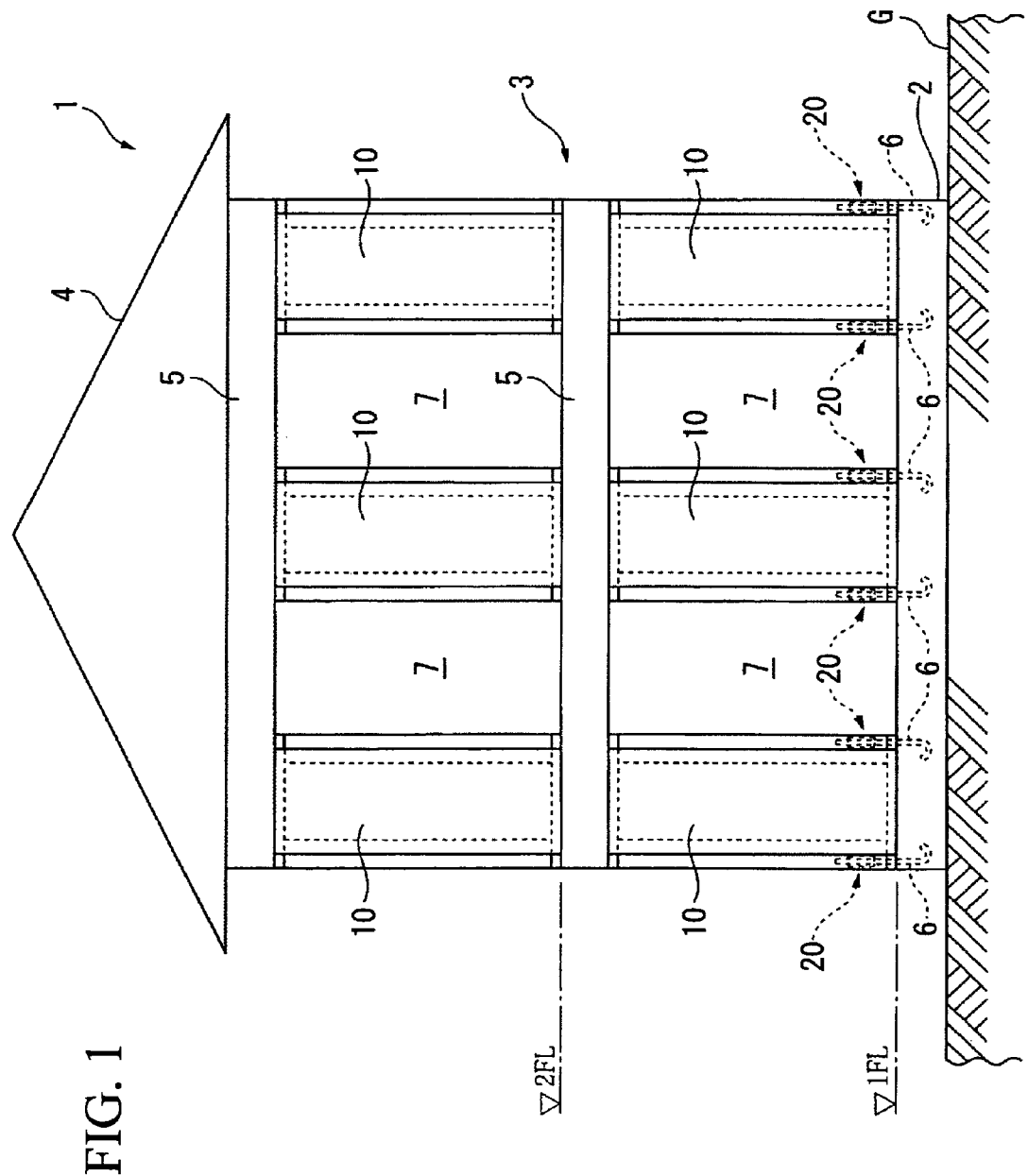
FIG. 1 is a front view showing the schematic construction of a building including a metal joint according to a first embodiment of the present invention.
Figure 2:
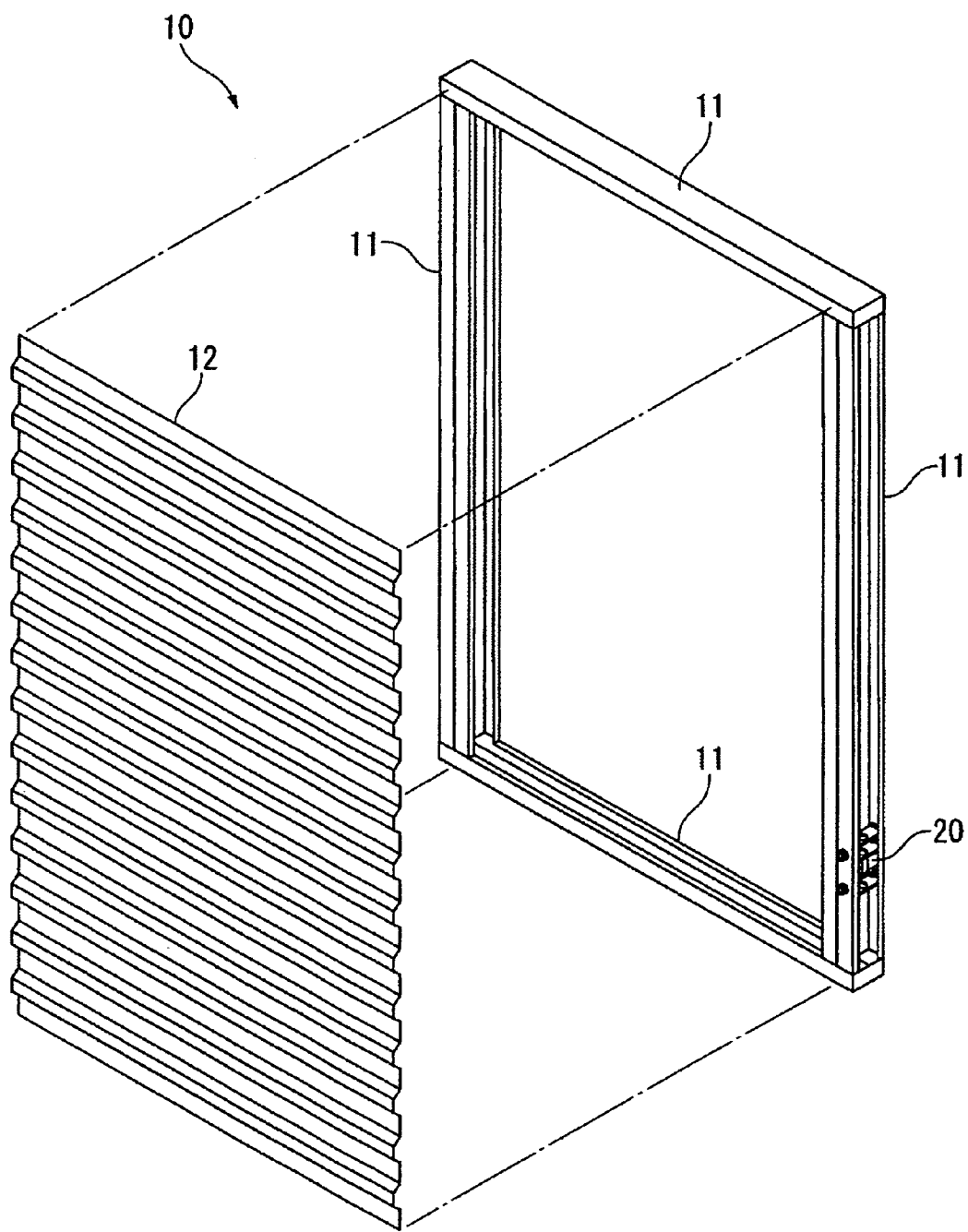
FIG. 2 is an exploded perspective view of a bearing wall of the building.
Figure 3:
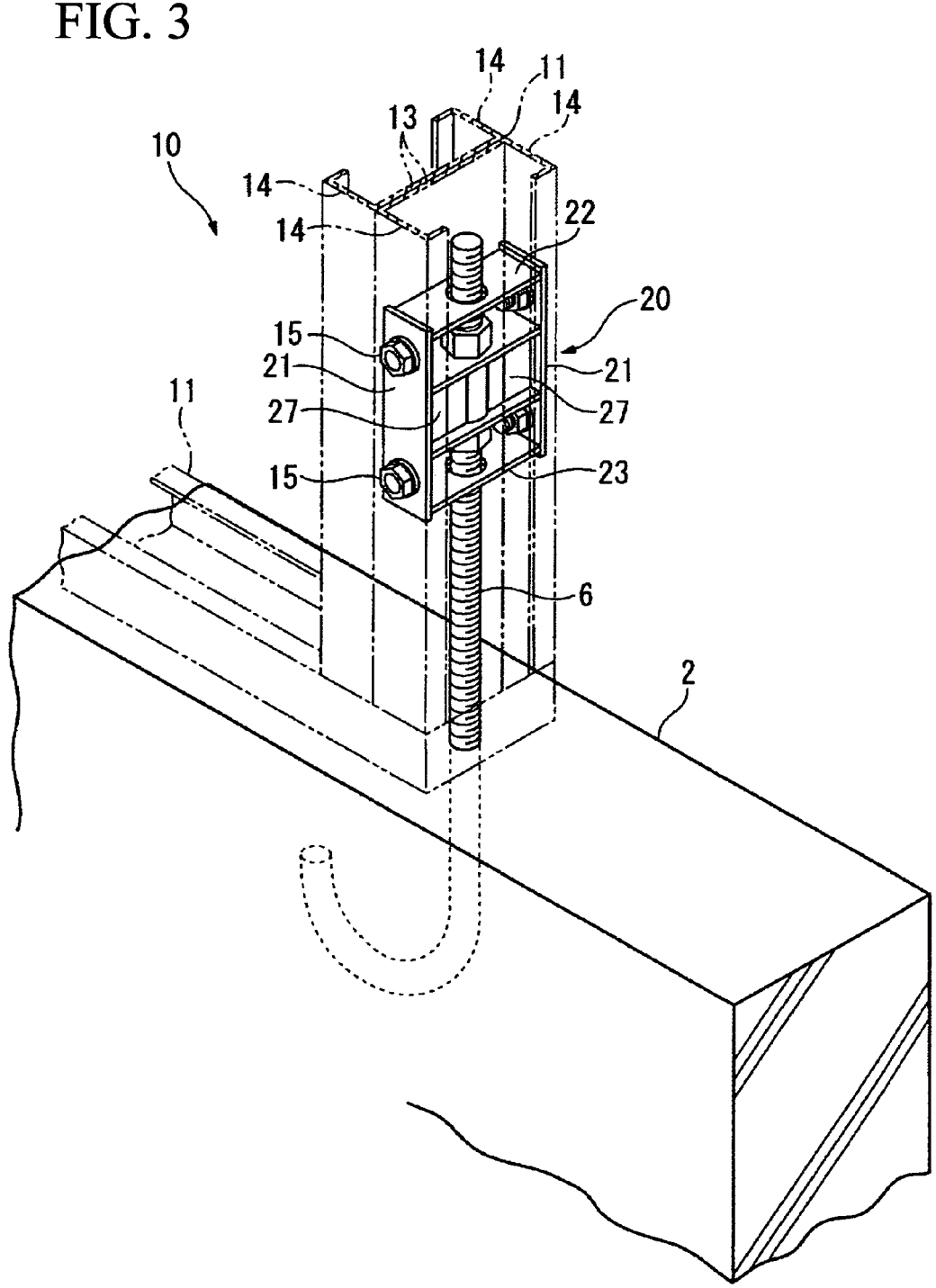
FIG. 3 is a perspective view showing connection construction between the bearing wall and building foundation.

FIG. 1 is a front view showing the schematic construction of a building 1, which is constructed by a wood frame construction method, according to this embodiment. FIG. 2 is an exploded perspective view of a bearing wall 10 of the building 1 that is constructed by a wood frame construction method. FIG. 3 is a perspective view showing a connection portion between the bearing wall 10 and a foundation 2.

In FIGS. 1 to 3, the building 1, which is constructed by a wood frame construction method, is a two-story house including a foundation 2 that is constructed on the ground G and is made of reinforced concrete, a building body 3 that is fixed to the foundation 2, and a roof 4 that is provided to cover an upper portion of the building body 3.

The building body 3 includes a plurality of bearing walls 10 that is provided on floor, beams 5 that are provided at positions corresponding to each floor, floor panels (not shown), and the like. The bearing walls 10, the beams 5, and the floor panels are bound to one another. Lower ends of the bearing walls 10 of the first floor are bound to the building foundation 2 by anchor bolts 6. Upper ends of the bearing walls 10 of the first floor and upper and lower ends of the bearing walls 10 of the second floor are bound to the beams 5 by appropriate joint members. A plurality of bearing walls 10 is disposed on each floor, and openings 7 are formed between the bearing walls 10.

As shown in FIG. 2, the bearing wall 10 includes frame members 11 and a face member 12. The frame member is made of light-gauge steel (lip channel steel). The face member is joined to one surface of a frame where the frame members 11 are framed in a quadrangular shape, and is formed of a corrugated steel plate. That is, the building 1, which is constructed by a wood frame construction method, is a steel house where the frame member 11 of the bearing wall 10 is made of light-gauge steel and the face member is formed of a corrugated steel plate. A heat insulating material (not shown), an exterior material (siding), or the like is provided on the side of the bearing wall 10 facing the outside. An interior material or the like is provided on the side of the bearing wall 10 facing the inside.

The frame member 11 of the bearing wall 10 includes a web 13 and flanges 14 that are a pair of opposite faces connected to both ends of the web 13, and is formed to have a hollow shape and a substantially U-shaped (or C-shaped) cross section. Vertical frame members 11 of the frame members 11, which are provided at both side edges, are formed by joining the webs 13 of two channel steels. Further, the face member 12 is joined to the frame members 11 by screws (tapping screws) that are to be provided at predetermined join intervals. The shear yield strength of the bearing wall 10 per length in a horizontal direction is appropriately set by adjusting the join interval of the screw, the material (material strength) or thickness of the face member 12, or the like.

As shown in FIG. 3, a metal joint 20 is provided in a hollow portion, which is surrounded by the web 13 and the pair of flanges 14, on each of the left and right vertical frame members 11 at the lower end (wall leg) of the bearing wall 10 of the first floor. The metal joint 20 is fixed to the flanges 14 of the frame member 11 by bolts 15, and is connected to an anchor bolt 6 that extends from the foundation 2. Further, when a horizontal force such as an earthquake is input to the building 1, the bearing wall 10 bears the horizontal force and causes rocking, and a force is applied in a direction where one of left and right lower ends of the bearing wall 10 rises from the foundation 2. Accordingly, the metal joint 20 exerts a damping effect.

That is, when the horizontal force is applied from one side of the bearing wall 10, the bearing wall 10 rocks so that the lower end of one vertical frame member 11 rises from the foundation 2. Accordingly, the metal joint 20 mounted on one frame member 11 is pulled by the anchor bolt 6, deforms, and exerts a damping effect. In this case, since the lower end of the other vertical frame member 11 is placed on an upper surface of the foundation 2, the displacement thereof is very small and the metal joint 20 mounted on the other frame member 11 is not deformed.

The metal joint 20 will be described in detail below with reference to FIGS. 4 and 5.

Figure 4:
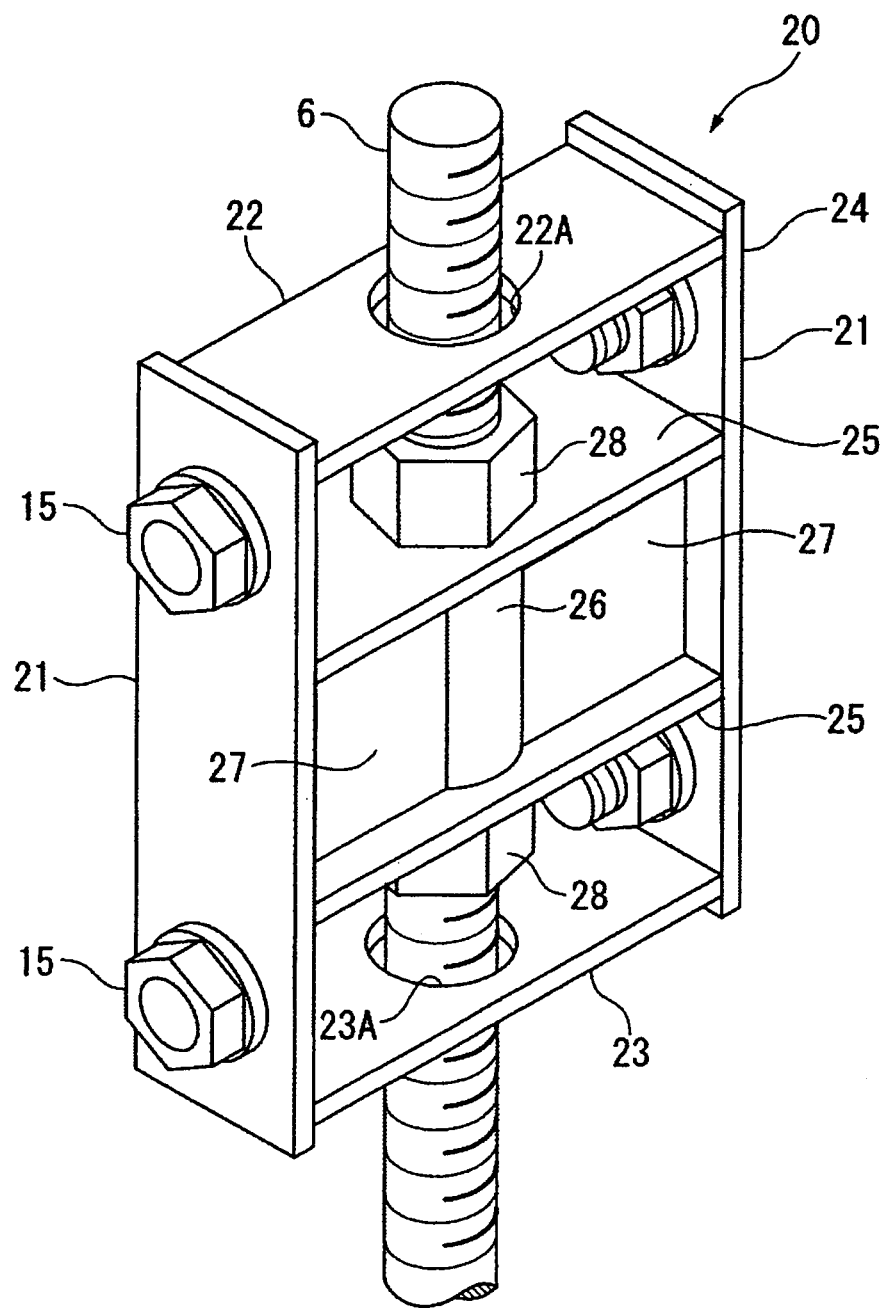
FIG. 4 is a perspective view of the metal joint of the connection construction.

FIG. 4 is a perspective view showing the metal joint 20 and the anchor bolt 6. FIG. 5 is a front view showing that the metal joint 20 is deformed.

Figure 5:
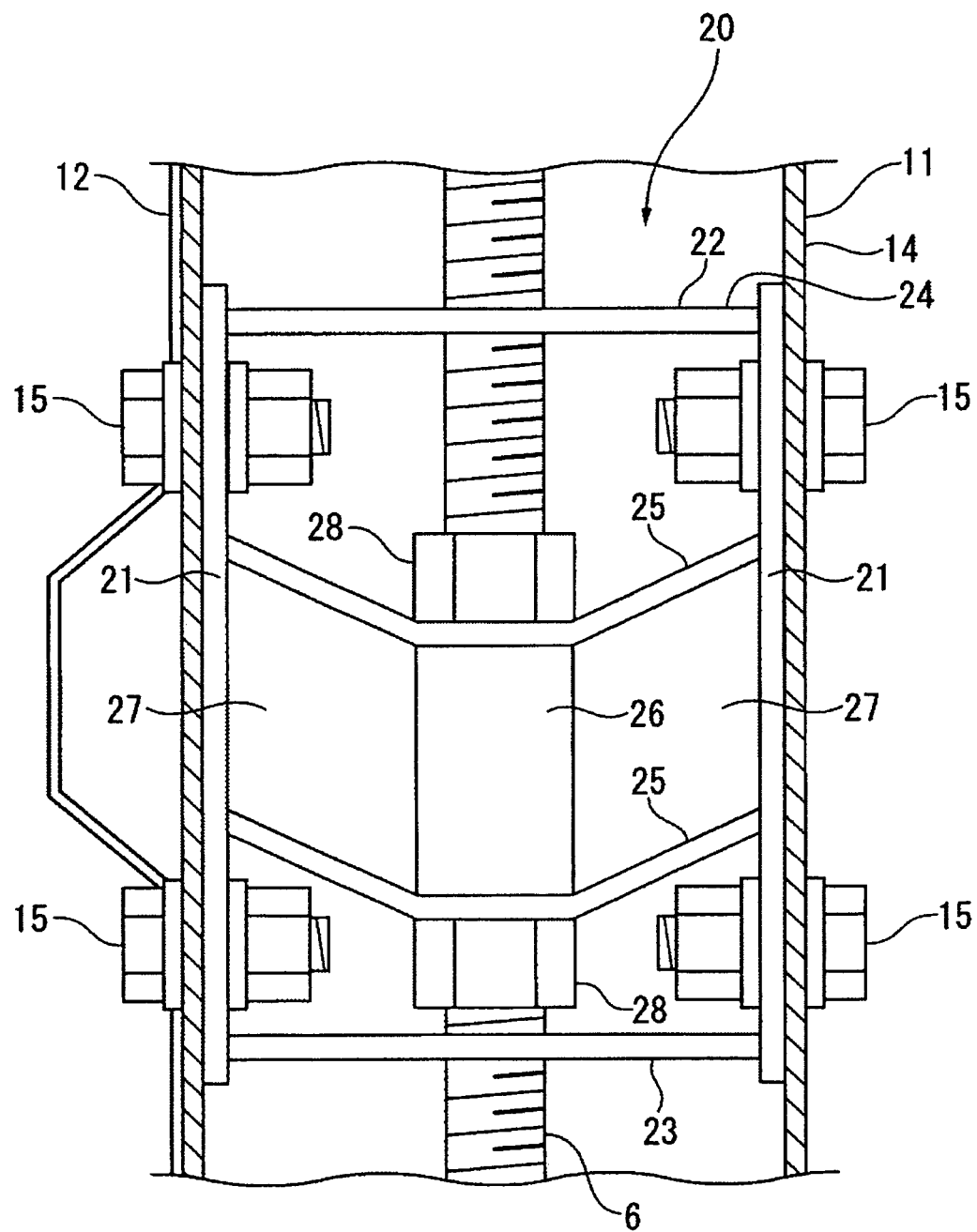
FIG. 5 is a front view showing that the metal joint is deformed.

As shown in FIGS. 4 and 5, the metal joint 20 includes wall connecting steel plates 21 that are a pair of wall connecting parts connected to the flanges 14 of the frame member 11, an upper reinforcing steel member 22 that is jointed to upper portions of the pair of wall connecting steel plates 21, and a lower reinforcing steel member 23 that is jointed to lower portions of the pair of wall connecting steel plates 21. Further, the metal joint 20 includes a quadrangular frame 24 that is formed by the wall connecting steel plates 21 and upper and lower reinforcing steel members 22 and 23. Insertion holes 22A and 23A, into which the anchor bolt 6 is inserted, are formed substantially in the middle portions of the upper and lower reinforcing steel members 22 and 23, respectively.

Upper and lower flange plates 25 that are provided between the pair of wall connecting steel plates 21, a cylindrical steel member 26 that is formed between the pair of wall connecting steel plates 21 at the middle position of the plate and connects the upper and lower flange plates 25, and damper steel plates 27 that are damping members extending from left and right portions of the cylindrical steel member 26 in a radial direction of the cylindrical steel member are provided in the frame 24 of the metal joint 20. The upper and lower flange plates 25 are joined to the wall connecting steel plates 21 by welding. Insertion holes, into which the anchor bolt 6 is inserted, are formed in the middle portions of the flange plates 25. The cylindrical steel member 26 is an anchor connecting part that is connected to the anchor bolt 6. While the anchor bolt 6 is inserted into the hollow portion of the cylindrical steel member, nuts 28 are tightened from upper and lower sides of the upper and lower flange plates 25, so that the anchor bolt 6 is connected to the cylindrical steel member.

The pair of damper steel plates 27 is composed of rectangular steel plates. Outer side edges of the damper steel plates are joined to the inner surfaces of the wall connecting steel plates 21 by welding, inner side edges thereof are joined to the peripheral surface of the cylindrical steel member 26 by welding, and upper and lower edges thereof are joined to the upper and lower flange plates 25 by welding. The pair of damper steel plates 27 is disposed substantially symmetrically with respect to an axis of the anchor bolt 6. When the bearing wall 10 rocks and the frame member 11 rises, the frame member 11 and the frame 24 of the metal joint 20 are moved upward and the cylindrical steel member 26 thereof is pulled downward by the anchor bolt 6 as shown in FIG. 5. As a result, the pair of damper steel plates 27 is sheared. Further, the shear yield of the sheared damper steel plates 27 occurs at a predetermined shear strength, and the damper steel plates absorb energy while being repeatedly deformed while drawing a predetermined hysteresis loop of a relationship between shear deformation and yield strength. That is, a damping effect (hysteretic damping), which corresponds to the hysteresis absorption energy of the damper steel plates 27, is exerted.

Figure 6:
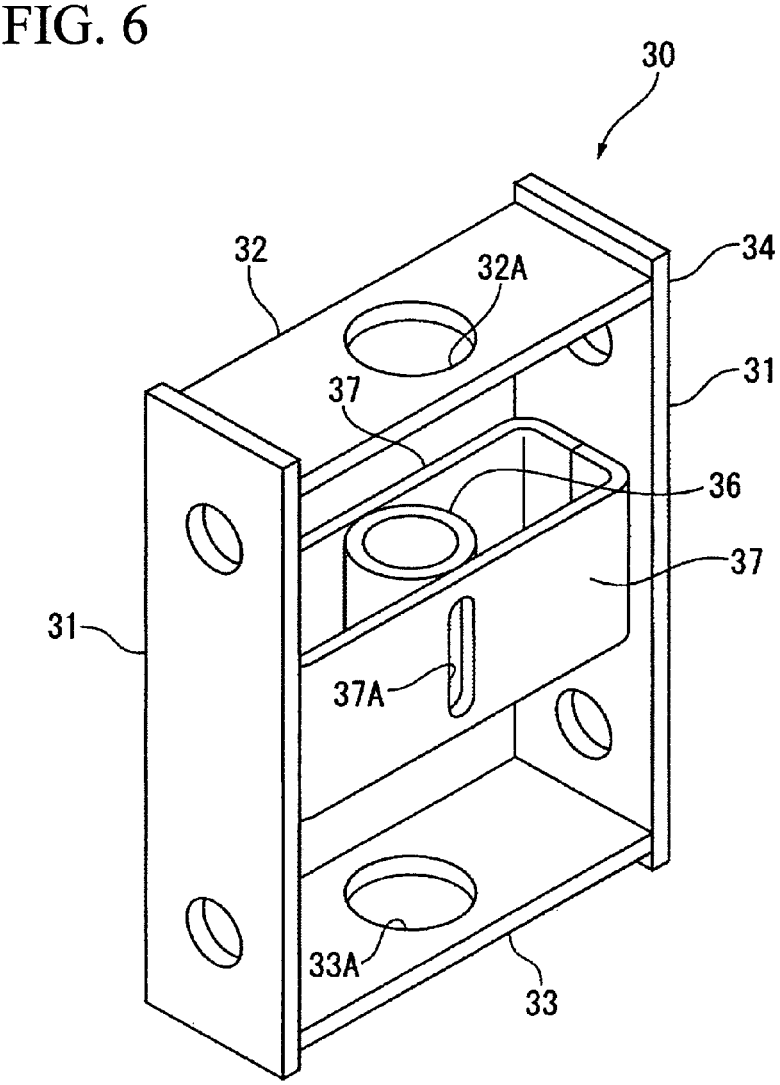
FIG. 6 is a perspective view showing a modification of the metal joint.
Figure 7:
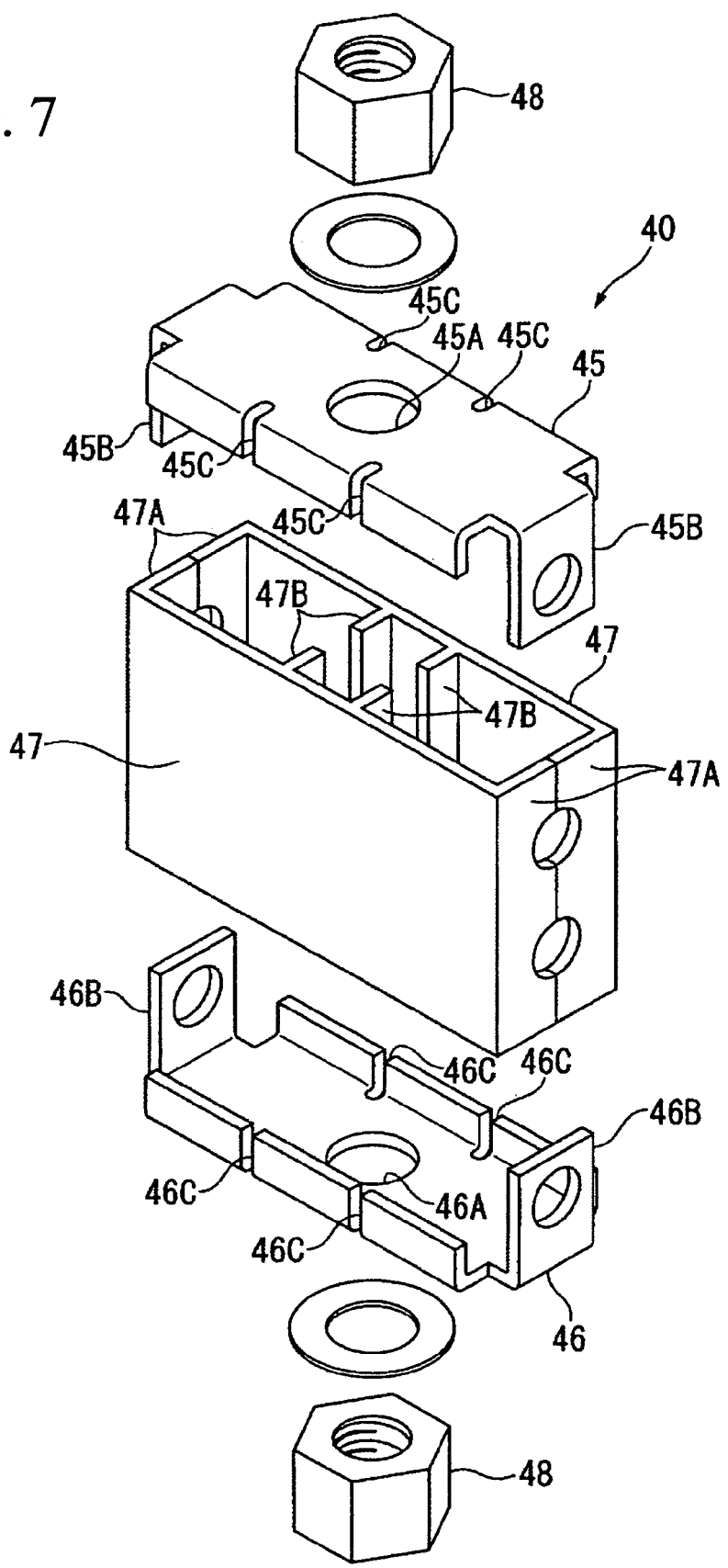
FIG. 7 is a perspective view showing another modification of the metal joint.

Meanwhile, the metal joint mounted on the bearing wall 10 is not limited to the above-mentioned construction, and may employ the construction of the following metal joint 30 and 40 shown in FIGS. 6 and 7.

FIGS. 6 and 7 are a perspective view and an exploded perspective view of metal joint 30 and 40 according to modifications of this embodiment, respectively.

The metal joint 30 shown in FIG. 6 includes a frame 34 that is formed by wall connecting steel plates 31 and upper and lower reinforcing steel members 32 and 33, like the metal joint 20. Insertion holes 32A and 33A, into which the anchor bolt 6 is inserted, are formed substantially in the middle portions of the upper and lower reinforcing steel members 32 and 33, respectively.

A pair of (front and rear) damper steel plates 37 that is provided between the pair of wall connecting steel plates 31, and a cylindrical steel member 36 that is provided between the pair of damper steel plates 37 are provided in the frame 34 of the metal joint 30. The cylindrical steel member 36 is an anchor connecting part that is connected to the anchor bolt 6. While the anchor bolt 6 is inserted into the hollow portion of the cylindrical steel member, nuts 28 are tightened from upper and lower sides, so that the anchor bolt 6 is connected to the cylindrical steel member. The damper steel plate 37 is formed to have a substantially U-shaped cross section. Both ends of the damper steel plate are joined to the wall connecting steel plates 31 by welding (flare welding), and are joined to the cylindrical steel member 36 through slits 37A, which are formed in the middle portions of the damper steel plates, by welding (slot welding). That is, the damper steel plates 37 are joined to the peripheral surface of the cylindrical steel member 36 so as to extend in a tangential direction, and are disposed between the pair of wall connecting steel plates 31 and the cylindrical steel member 36, respectively.

Meanwhile, the metal joint 40 shown in FIG. 7 does not include the frames 24 and 34. The metal joint 40 includes upper and lower edge connecting members 45 and 46 that make a pair and are provided as anchor connecting parts, and two (front and rear) damper steel plates 47 that face each other and extend substantially parallel to each other. The upper and lower edge connecting members 45 and 46 are used to connect the upper and lower edges of the two damper steel plates 47, respectively. Insertion holes 45A and 46A, into which the anchor bolt 6 is inserted, are formed at the edge connecting members, respectively.

The upper and lower edge connecting members 45 and 46 are connected to the anchor bolt 6 by tightening nuts 48 from upper and lower sides, and are joined to the flanges 14 of the frame member 11 through fixing pieces 45B and 46B, which are formed at both (left and right) ends of the upper and lower edge connecting members by folding or bending, by bolts. The damper steel plate 47 is formed to have a substantially U-shaped cross section. Fixing pieces 47A, which are formed at both ends of the damper steel plate by folding or bending, are joined to the fixing pieces 45B and 46B of the upper and lower edge connecting members 45 and 46 and the flanges 14 of the frame member 11 by bolts. That is, wall connecting parts of the metal joint 40 are composed of the fixing pieces 45B and 46B and the fixing pieces 47A.

A pair of ribs 47B, which extends in a vertical direction, is formed on the inner surface of each of the damper steel plates 47, and the anchor bolt 6 may be inserted into a portion that are surrounded by the ribs 47B. Further, four notches 45C and 46C are formed on the upper and lower edge connecting members 45 and 46 at positions that correspond to the ribs 47B. When the metal joint 40 is deformed, the notches 45C and 46C do not restrict the shear deformation of the damper steel plates 47. The plate-like portions of the damper steel plates 47, which are positioned between the fixing pieces 47A and the ribs 47B, are sheared, so that the damper steel plates exert a damping effect.

According to this embodiment that has been described above, the following various effects can be obtained.

That is, in this embodiment, the metal joint 20, 30, or 40, which is connected to the building foundation 2, has been provided at the wall leg of the bearing wall 10 of the building 1 that is constructed by a wood frame construction method. As a result, when a horizontal force such as an earthquake is input to the building 1, the bearing wall 10 rocks and the damper steel plates 27, 37, or 47 of the metal joint 20, 30, or 40 are deformed, so that a damping effect is exerted. Therefore, energy corresponding to the damping effect of the metal joint 20, 30, or 40 is absorbed, so that the vibration of the building 1 may be suppressed and earthquake resisting performance may be improved. Further, if the damper steel plates 27, 37, or 47 are set to yield against rocking by shearing while the bearing wall 10 bears a predetermined shear force, the shear force born by the bearing wall 10 does not become excessively large. That is, since the period of vibration of the building 1 is increased due to the yield of the damper steel plates 27, 37, or 47, the input energy of an earthquake may be suppressed and the economical building 1 may be designed.

Further, in the metal joint 20, 30, or 40, the wall connecting parts (the wall connecting steel plates 21 or 31, or the fixing pieces 45B, 46B, or 47A) are disposed on left and right sides while making a pair, and the damping members (the damper steel plates 27, 37, or 47) are disposed substantially symmetrically with respect to the axis of the anchor bolt 6. As a result, it is possible to prevent the generation of load stress, which is caused by the eccentricity when a damping effect is exerted. Therefore, reinforcement is not needed against load stress such as eccentric bending moment that is applied to the wall leg (the frame member 11) of the bearing wall 10 or the degree of the reinforcement may be minimized, so that the increase of manufacturing cost of the bearing wall 10 may be prevented. In addition, since load stress is not generated, a force is smoothly transmitted between the anchor bolt 6 and the bearing wall 10 through the metal joint 20, 30, or 40. As a result, the dynamic mechanism of the damper steel plates 27, 37, or 47 becomes clear and a damping effect is reliably and appropriately exerted, so that vibration energy caused by an earthquake or the like may be effectively absorbed.

In addition, the wall connecting parts (the wall connecting steel plates 21 or 31, or the fixing pieces 45B, 46B, or 47A) are connected to the frame member 11 of the bearing wall 10, and the anchor connecting part (the cylindrical steel member 26 or 36, or the upper and lower edge connecting members 45 and 46) is connected to the anchor bolt 6, so that the bearing wall 10 and the building foundation 2 are connected to each other by the metal joint 20, 30, or 40. According to the construction, general structure may be employed in the bearing wall 10 or the building foundation 2. Further, since the damper steel plates 27, 37, or 47 are disposed in the metal joint 20, 30, or 40, the damper steel plates 27, 37, or 47 do not need to be directly welded to the bearing wall 10. For this reason, the bearing wall 10 or the metal joint 20, 30, or 40 may be easily manufactured or installed, so that workability may be improved. In addition, the metal joint 20, 30, or 40 may be easily separated from the bearing wall 10, so that maintainability, such as check or replacement after an earthquake, may be improved.

The metal joint 20 or 30 employs the construction where the pair of wall connecting steel plates 21 or 31 is connected to each other by the upper reinforcing steel member 22 or 32 and the lower reinforcing steel member 23 or 33 so as to form the frame 24 or 34 and the damper steel plates 27 or 37 and the cylindrical steel member 26 or 36 are disposed in the frame. According to this construction, when a damping effect caused by the damper steel plates 27 or 37 acts on the wall connecting steel plates 21 or 31, the deformation of the wall connecting steel plates 21 or 31 may be prevented. In addition, the anchor bolt 6 is inserted into the insertion holes 22A and 23A, or 32A and 33A that are formed at the upper reinforcing steel member 22 or 32 and the lower reinforcing steel member 23 or 33, so that the eccentricity between the anchor bolt 6 and the frame 24 or 34 may not be generated. As a result, since it is possible to prevent the generation of load stress that is caused by the eccentricity, a damping effect of the damper steel plates 27 or 37 may be appropriately transmitted between the bearing wall 10 and the building foundation 2.

Second Embodiment

A second embodiment of the present invention will be described below with reference to FIGS. 8 to 10.

Figure 8:
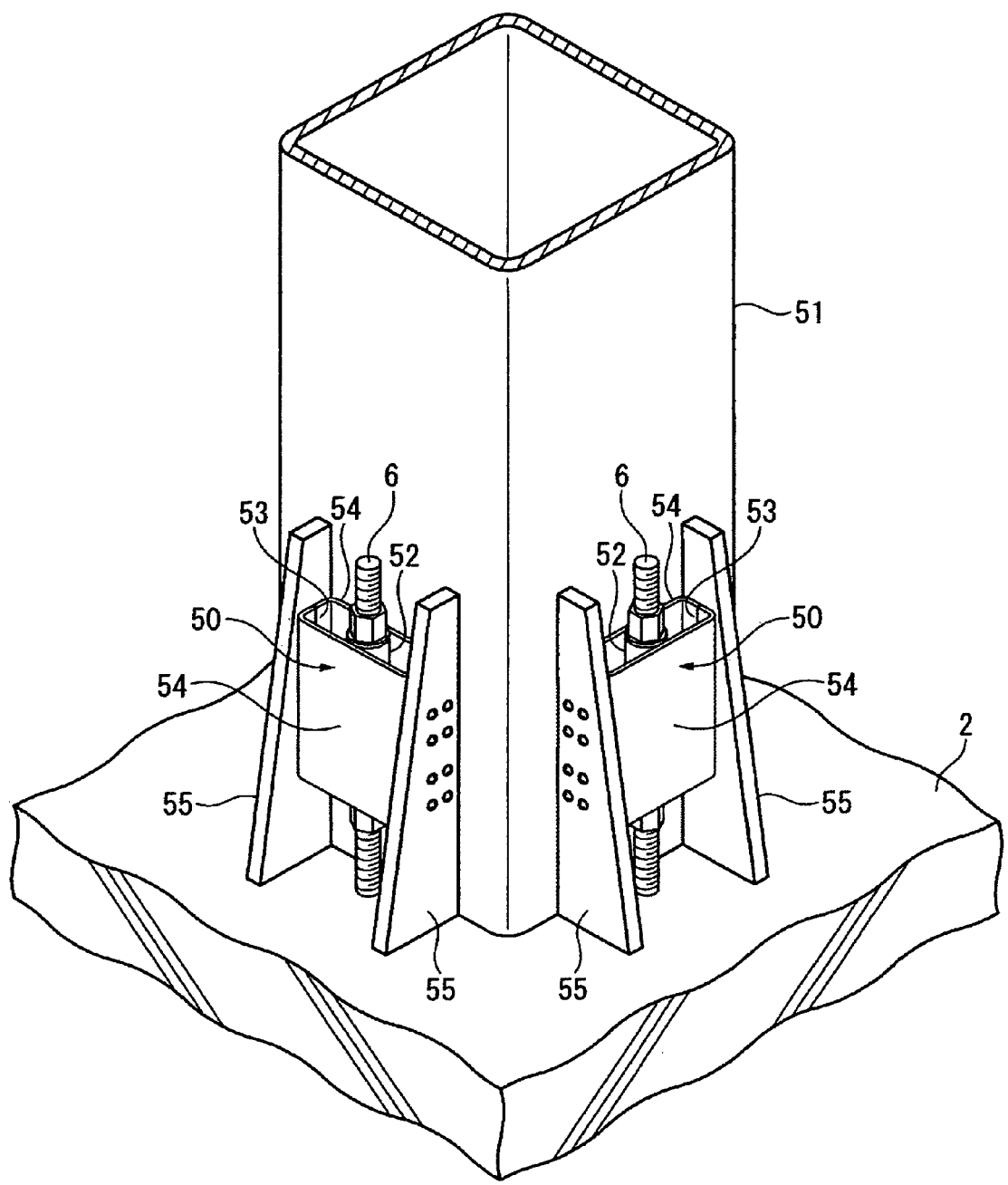
FIG. 8 is a perspective view showing a part of a building including a metal joint according to a second embodiment of the present invention.
Figure 9:
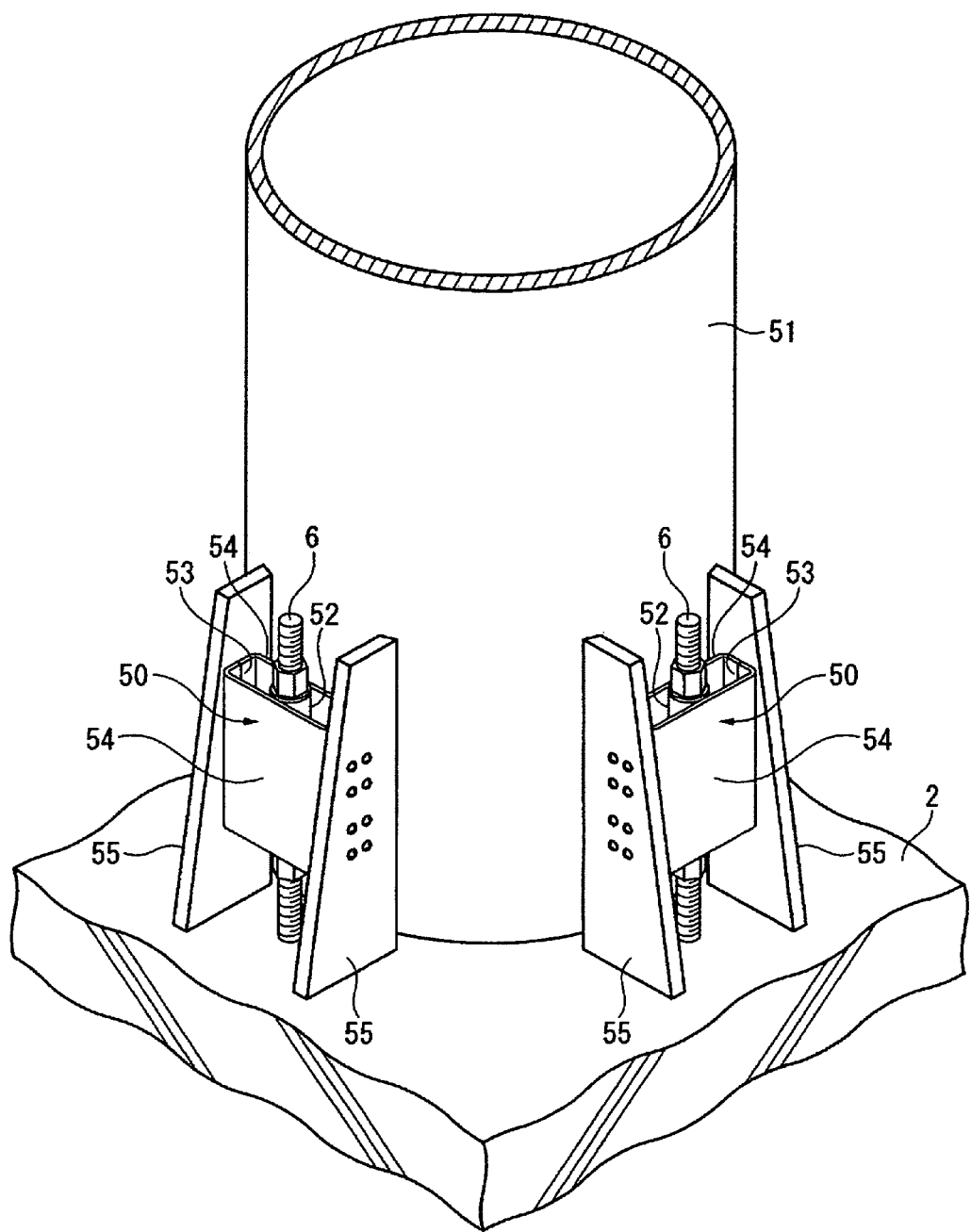
FIG. 9 is a perspective view showing a modification of the second embodiment.
Figure 10:
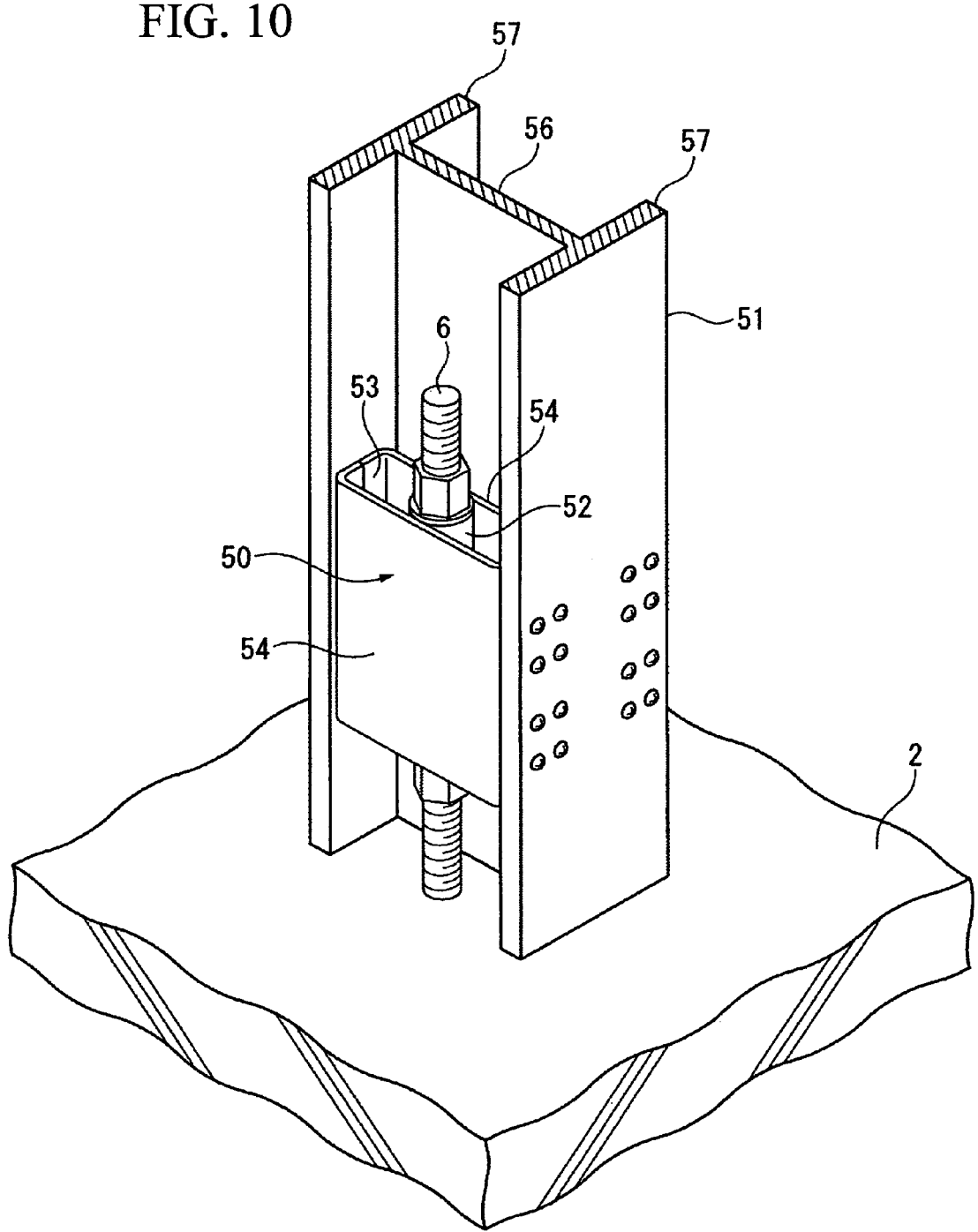
FIG. 10 is a perspective view showing another modification of the second embodiment.

FIGS. 8 to 10 are perspective views showing a part of a building including a metal joint according to this embodiment of the present invention.

In FIGS. 8 to 10, metal joints 50 are mounted on a column leg of a column 51 that is installed on a building foundation 2, and exert a damping effect by the rocking or rise of the column 51. The metal joint 50 has substantially the same construction as each of the metal joints 20, 30, and 40 according to the first embodiment. The metal joint includes a cylindrical steel member 52 that is a first connecting part connected to an anchor bolt 6, that is, an anchor member which is fixed to the building foundation 2 and extends upward; a fixing piece 53 that is a second connecting part connected to the column 51; and a pair of damper steel plates 54 that is damping members joined to the cylindrical steel member 52 and the fixing piece 53.

The column 51 shown in FIG. 8 is composed of a square steel pipe, and a pair of brackets 55 protrudes from each of peripheral surfaces of the column. The metal joint 50 is fixed between the pair of brackets 55. The column 51 shown in FIG. 9 is composed of a circular steel pipe, and a pair of brackets 55 protrudes from each of four positions on the outer peripheral surface of the column. The metal joint 50 is fixed between the pair of brackets 55. The column 51 shown in FIG. 10 is made of H-section steel, and the metal joint 50 is fixed between a pair of flange 57 that is formed at two positions with a web 56 of the H-section steel therebetween. When the column 51 rocks or the building foundation 2 rises, the damper steel plates 54 of this metal joint 50 are deformed in accordance with the relative displacement between the fixing piece 53 that is moved together with the column 51 as a single body and the cylindrical steel member 52 of which the movement is restricted by the anchor bolt 6. A damping effect is exerted by the deformation of the damper steel plates 54.

Third Embodiment

A third embodiment of the present invention will be described below with reference to FIGS. 11 and 12A to 12C.

Figure 11:
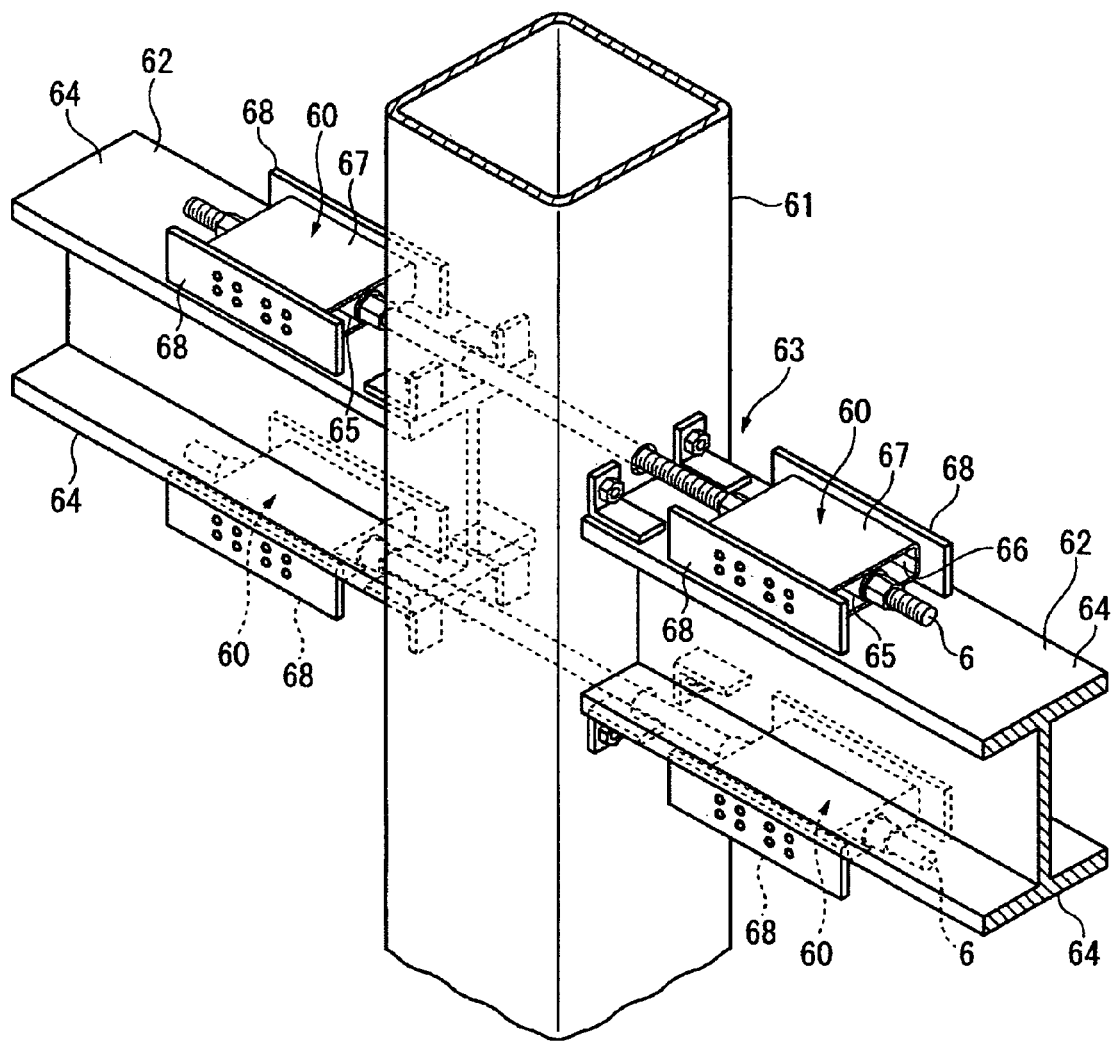
FIG. 11 is a perspective view showing a part of a building including a metal joint according to a third embodiment of the present invention.

FIG. 11 is a perspective view showing a part of a building including a metal joint according to this embodiment.

In FIG. 11, metal joints 60 are mounted to the ends of the beams 62 at column-beam joint portions 63 where a column 61 of a building is joined to beams 62, and exert a damping effect by the expansion and contraction of upper and lower flanges 64 that are caused by the bending of the beams 62. The metal joint 60 has substantially the same construction as each of the metal joints 20, 30, 40, and 50 according to the first and second embodiments. The metal joint includes a cylindrical steel member 65 that is a first connecting part connected to an anchor bolt 6, that is, an anchor member which is fixed to the column 61 or the end of each of the beams 62 that face each other with the column 61 interposed therebetween; a fixing piece 66 that is a second connecting part connected to the end of the beam 62; and a pair of damper steel plates 67 that is damping members connecting the cylindrical steel member 65 to the fixing piece 66.

The column 61 is composed of a square steel pipe, the beam 62 is made of H-section steel, a pair of brackets 68 protrudes from the outer surface of each of the upper and lower flanges 64 of the beam 62, and the metal joint 60 is fixed between the pair of brackets 68. The anchor bolt 6 penetrates the column 61, is provided over the left and right metal joints 60, and is fixed to the cylindrical steel members 65 of the left and right metal joints 60. When the beam 62 is bent and deformed, the damper steel plates 67 of this metal joint 60 are deformed in accordance with the relative displacement between the fixing piece 66 that is moved together with the upper and lower flanges 64 of the beams 62 as a single body and the cylindrical steel member 65 of which the movement is restricted by the anchor bolt 6. A damping effect is exerted by the deformation of the damper steel plates 67.

Figure 12A:
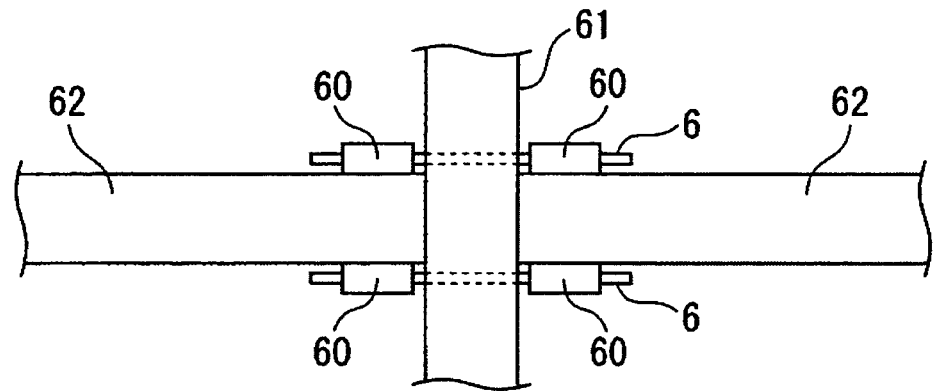
FIG. 12A is a front view showing a modification of the third embodiment.
Figure 12B:
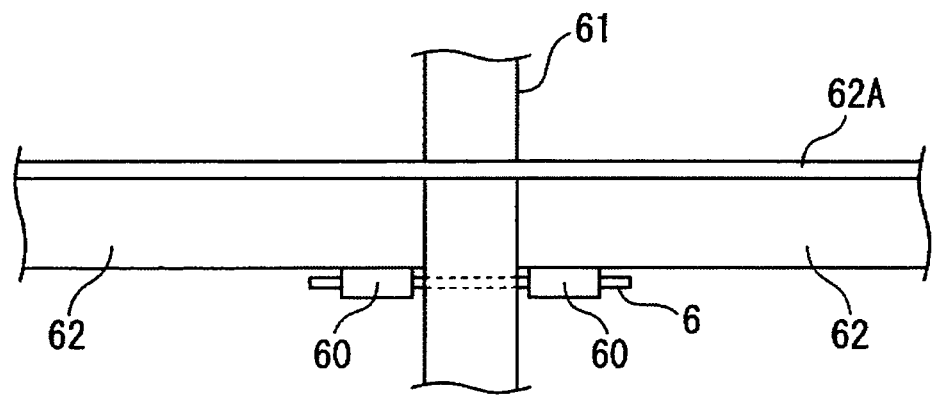
FIG. 12B is a front view showing another modification of the third embodiment.
Figure 12C:
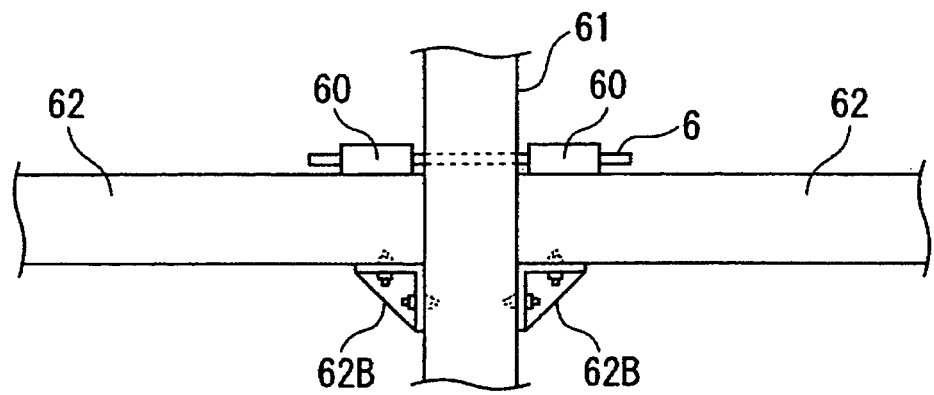
FIG. 12C is a front view showing another modification of the third embodiment.

FIGS. 12A to 12C are front views showing a part of the building according to this embodiment, FIG. 12A is a front view showing the same column-beam joint portion as that of FIG. 11, and FIGS. 12B and 12C are front views showing modifications of this embodiment.

As shown in FIG. 12B, the metal joints 60 are provided only on the lower end faces (lower flanges) of the beams 62, and the metal joints 60 are not provided on the upper end faces of the beams 62 on which a floor slab 62A is provided.

As shown in FIG. 12C, the metal joints 60 are provided only on the upper end faces (upper flanges) of the beams 62, and the metal joints 60 are not provided on the lower end faces of the beams 62 that are joined to the column 61 by connecting members 62B.

That is, in this embodiment, the metal joint 60 may be provided on at least one of the upper and lower end faces (upper and lower flanges) of the beam 62.

Fourth Embodiment

A fourth embodiment of the present invention will be described below with reference to FIG. 13 and FIGS. 14A to 14C.

Figure 13:
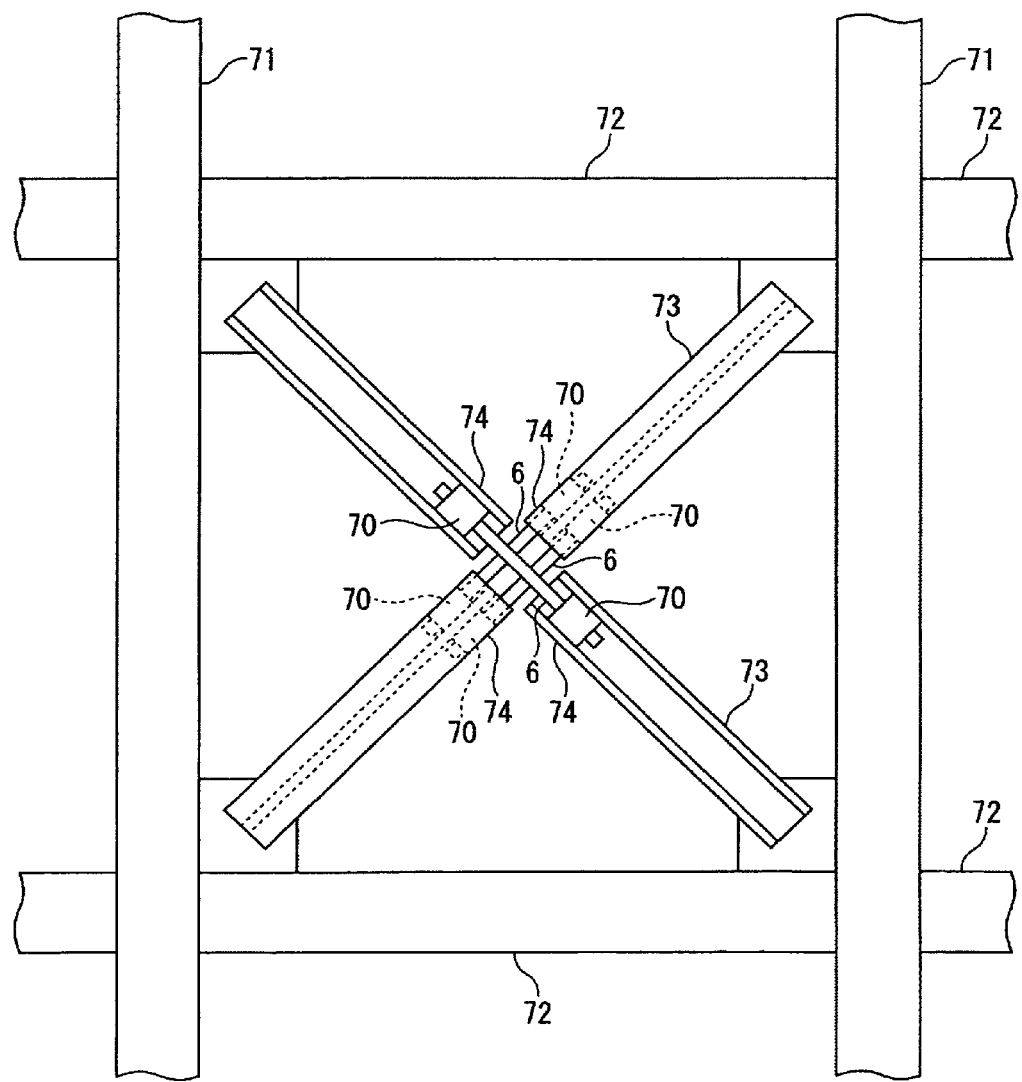
FIG. 13 is a front view showing a part of a building including a metal joint according to a fourth embodiment of the present invention.

FIG. 13 is a front view showing a part of a building including a metal joint according to this embodiment.

As shown in FIG. 13, metal joints 70 are mounted to brace joint portions 74, where braces 73 obliquely provided between left and right columns 71 and beams 72 of upper and lower floors are divided, in an inner portion surrounded by the columns 71 and the beams 72 of the building. A damping effect is exerted by the expansion and contraction of the braces 73. The metal joint 70 has substantially the same construction as each of the metal joints 20, 30, 40, 50, and 60 according to the first to third embodiments. The metal joint includes a second connecting part that is connected to one of the divided brace joint portions 74; a first connecting part that is connected to an anchor bolt 6, that is, an anchor member fixed to the other of the divided brace joint portions 74; and damping members that connect the first connecting part to the second connecting part.

Each of the braces 73 is made of H-section steel, flanges of one brace 73 (the brace inclined upward to the right in FIG. 13) are disposed parallel to the plane that is formed by the columns 71 and the beam 72, and a web of the other brace 73 (the brace inclined downward to the right in FIG. 13) is disposed parallel to the plane that is formed by the columns 71 and the beam 72. The metal joint 70 is fixed between the pair of flanges of the brace 73. That is, the metal joints 70 are mounted on one and the other braces 73 so as to intersect each other. Further, the anchor bolt 6 is provided over the divided brace joint portions 74 and connects the first connecting parts of a pair of metal joints 70. Furthermore, the anchor bolts 6, which are provided at one and the other braces 73, are disposed so as to pass positions where the anchor bolts do not interfere with each other. When the braces 73 expand or contract, the damping members of this metal joint 70 are deformed in accordance with the relative displacement between the second connecting part that is moved together with one divided brace 73 as a single body and the first connecting part of which the movement is restricted by the anchor bolt 6. A damping effect is exerted by the deformation of the damping members.

Figure 14A:
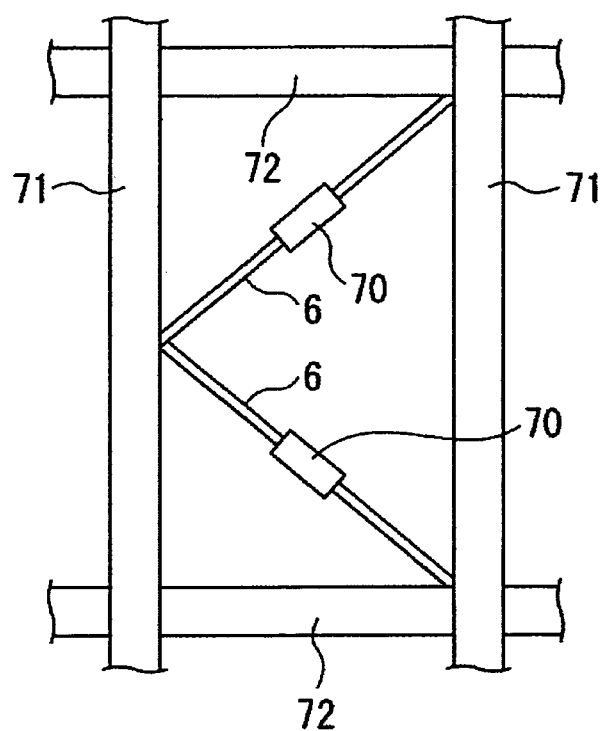
FIG. 14A is a front view showing a modification of the fourth embodiment.
Figure 14B:
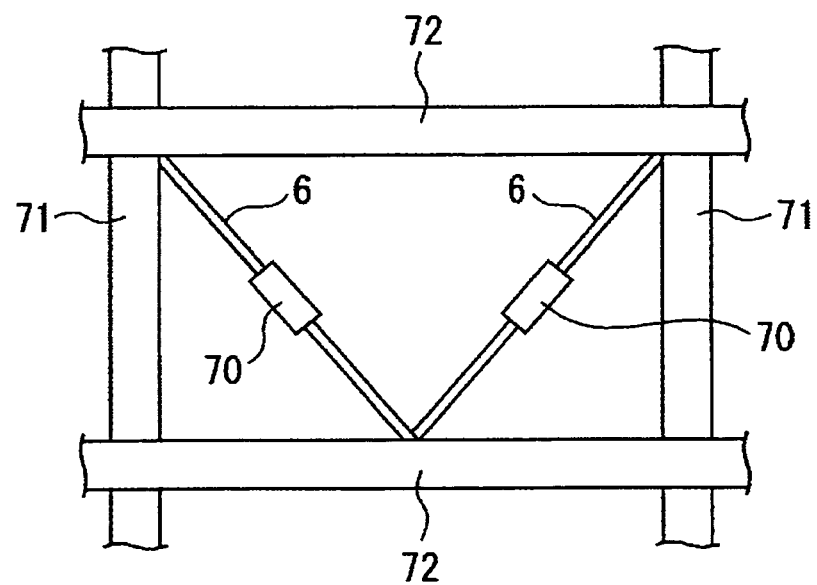
FIG. 14B is a front view showing another modification of the fourth embodiment.
Figure 14C:
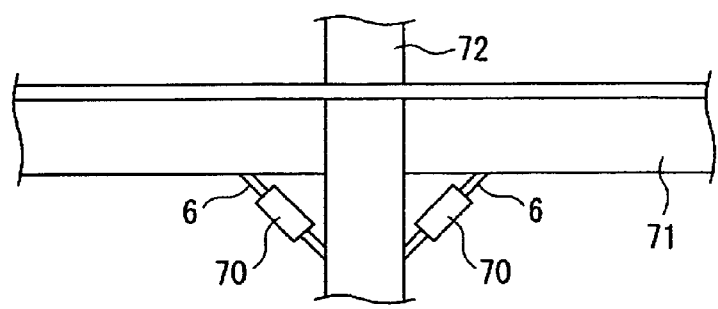
FIG. 14C is a front view showing another modification of the fourth embodiment.

FIGS. 14A to 14C are front views showing modifications of this embodiment.

As shown in FIGS. 14A and 14B, the braces make a pair in a V shape and are provided in an inner portion surrounded by the columns 71 and the beams 72. Each of the braces is provided with the metal joint 70. In the modification shown in FIG. 14A, the pair of braces intersects each other in the middle portion of the column 71. In the modification shown in FIG. 14B, the pair of braces intersects each other in the middle portion of the beam 72.

As shown in FIG. 14C, the braces extend to be inclined upward from the beam 72, and are symmetrically disposed on left and right sides of the beam so as to support the column 71 from the lower side of the column. Each of the braces is provided with the metal joint 70.

That is, in this embodiment, the installation form of the brace is not limited to an X type (counterbrace or X-type brace), and may be one of a V-type brace in horizontal and vertical directions, an oblique line type (standard brace), and an angle brace type.

Meanwhile, the present invention is not limited to each of the above-mentioned embodiments, and includes other construction that can achieve the object of the present invention. The following modifications are also included in the present invention.

For example, in the first embodiment, the metal joints 20, 30, or 40 according to the present invention have been provided in the building 1 that is a two-story house and is constructed by a wood frame construction method. However, the building may be a building of three or more stories, and is not limited to a house. In addition, a steel house where the frame member 11 of the bearing wall 10 is made of light-gauge steel has been described as the building 1 that is constructed by a wood frame construction method. However, the building is not limited thereto, and may be a building having two-by-four construction where a frame member 11 of a bearing wall 10 is made of a wood material. Further, the face member 12 of the bearing wall 10 is not limited to a corrugated steel plate, and various plates, such as a structural plywood, a cement molded panel, and a gypsum board, may be used as the face member.

Furthermore, arbitrary various steel members (steel members for building structural use or steel members for machine structural use) may be used as a steel member that forms each of the members of the metal joints 20, 30, 40, 50, 60, and 70. However, steel, which has a low yield point and is excellent in deformability, is preferably used as a steel member for the damper steel plates 27, 37, 47, 54, and 67 that exert hysteretic damping after yield. The damping members are not limited to the damper steel plates 27, 37, 47, 54, and 67 that are composed of steel members. As long as the damping member exerts a damping effect by the deformation, for example, the damping member is made of lead so as to exert viscous damping or is made of various resin materials or viscoelastic materials, a material of the damping member is not limited.

Meanwhile, a damping member, which has elastic-plastic deformability like the damper steel plate, exerts an excellent effect according to the magnitude of an earthquake. For example, if the intensity of an earthquake is low, stress applied to a member is equal to or lower than yield stress, that is, only elastic deformation occurs. Accordingly, the building and the damping member are not damaged. Meanwhile, if a large earthquake occurs, the damping member is sufficiently plastically deformed and absorbs vibration energy. Accordingly, the damage of a building may be suppressed as much as possible.

In contrast, if elastically deformable members such as various springs are used as a damping member, energy is not absorbed during a large earthquake and vibration amplitude is continued for a long time. Accordingly, there is a concern that a building is damaged.

In addition, if a viscous body such as an oil damper is used as a damping member, there is a drawback in that stable damping performance may not be obtained against various kinds of earthquakes since damping performance depends on amplitude speed or temperature.

For the above-mentioned reasons, it is highly preferable that a damper steel plate having elastic-plastic deformability be used as the damping member.

Figure 15:
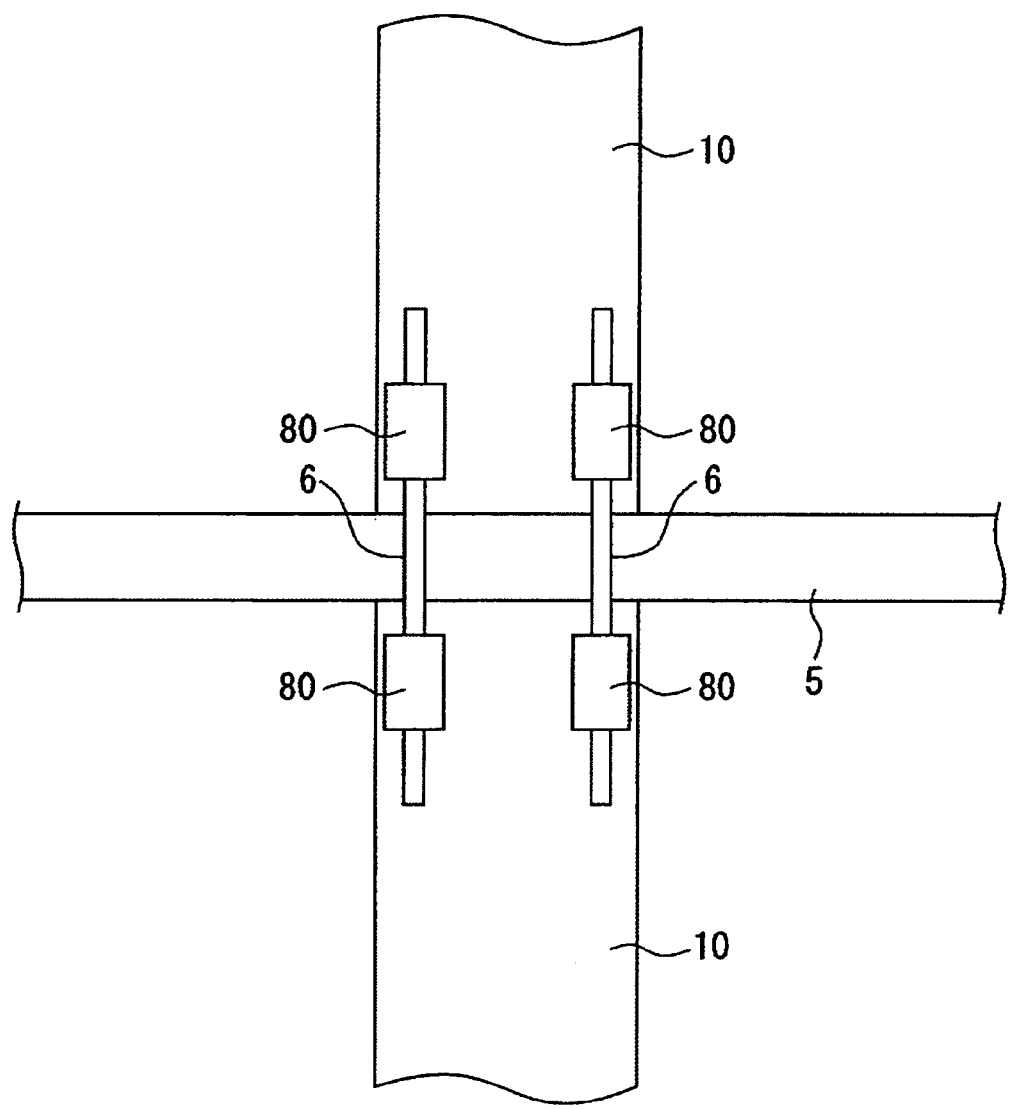
FIG. 15 is a front view showing another modification of the fourth embodiment.

Further, in the first embodiment, the metal joint 20 has been provided to connect the leg of the bearing wall 10 to the anchor bolt 6 of the building foundation 2. However, the present invention is not limited thereto, and the bearing walls 10 installed upstairs and downstairs may be connected to each other by metal joints 80 and anchor bolts 6 as shown in FIG. 15.

Figure 16:
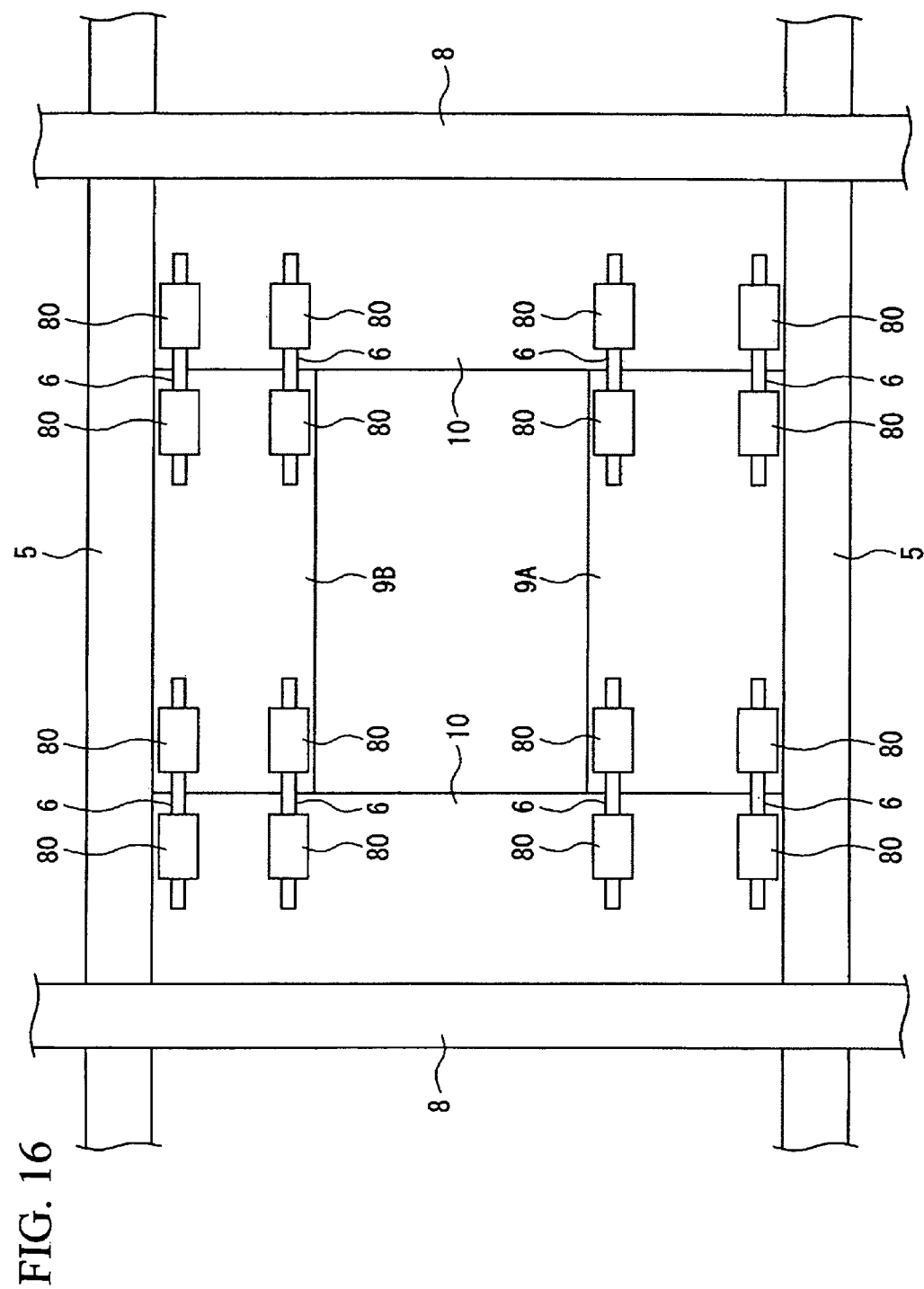
FIG. 16 is a front view showing another modification of the fourth embodiment.

In addition, the present invention is not limited to the construction where the upstairs and downstairs bearing walls 10 are connected to each other, and a bearing wall 10 and a spandrel wall 9A or a vertical wall 9B adjacent to the bearing wall may be connected to each other by a metal joint 80 and an anchor bolt 6 as shown in FIG. 16.

Figure 17:
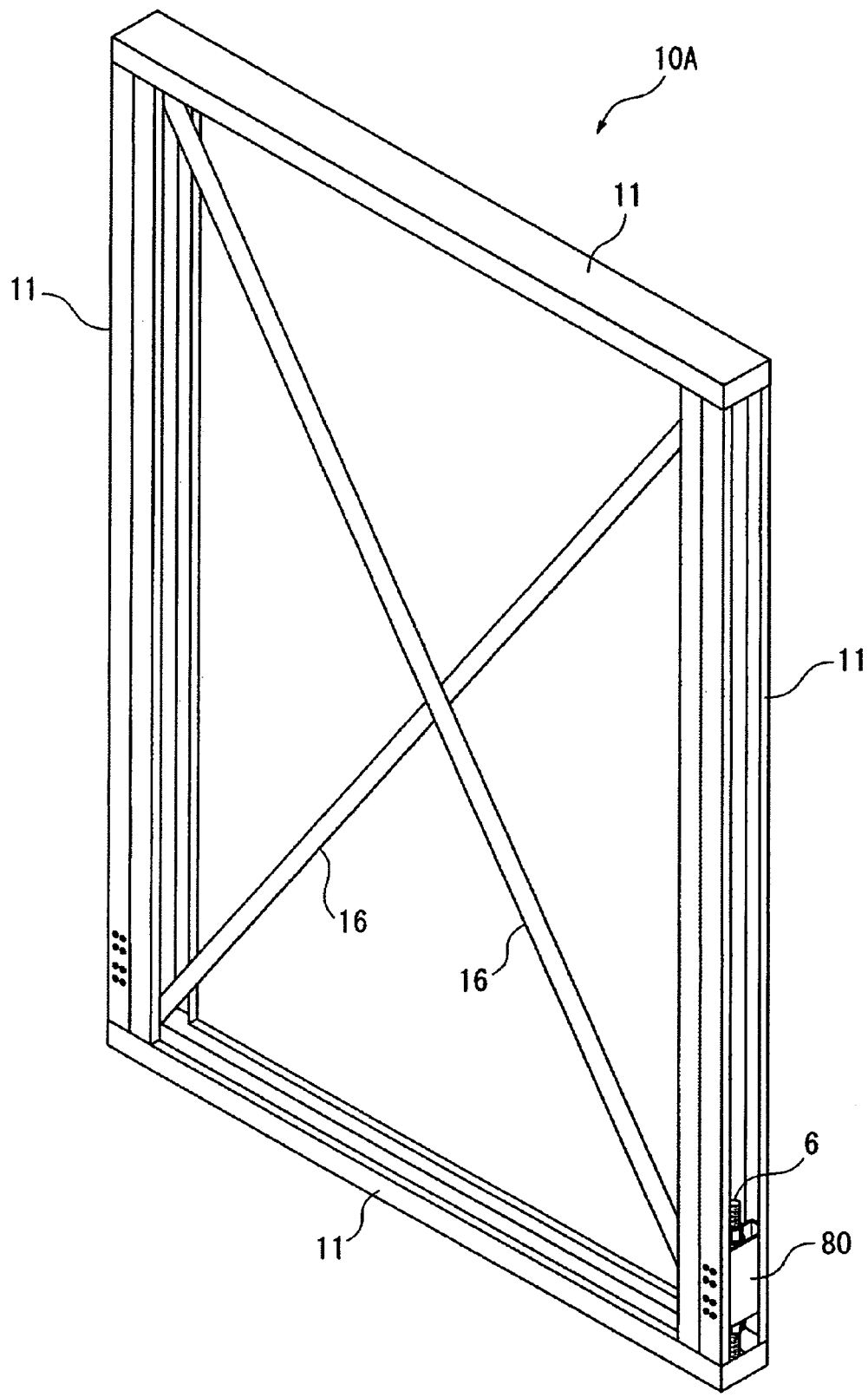
FIG. 17 is a perspective view showing another modification of the fourth embodiment.

Further, the bearing wall 10 is not limited to the bearing wall that includes the frame members 11 and the face member 12 jointed to the frame members 11 as described in the first embodiment, and may be a bearing wall 10A where brace members 16 are provided inside the frame members 11 as shown in FIG. 17.

The preferred construction, the preferred method, and the like for carrying out the present invention have been disclosed above, but the present invention is not limited thereto. That is, specific embodiments of the present invention have mainly been shown and described. However, those skilled in the art can modify the shape, the material, the number of members, and other detailed construction of the above-mentioned embodiment in various ways without departing from the scope and spirit of the present invention.

Accordingly, the descriptions limiting the above-mentioned shape, material, and the like are illustrative for the purpose of easy understanding of the present invention, and do not limit the present invention. Therefore, the descriptions of names of members except for the partial or entire limitation on the shape, material, and the like are included in the present invention.

Fifth Embodiment

Figure 18:
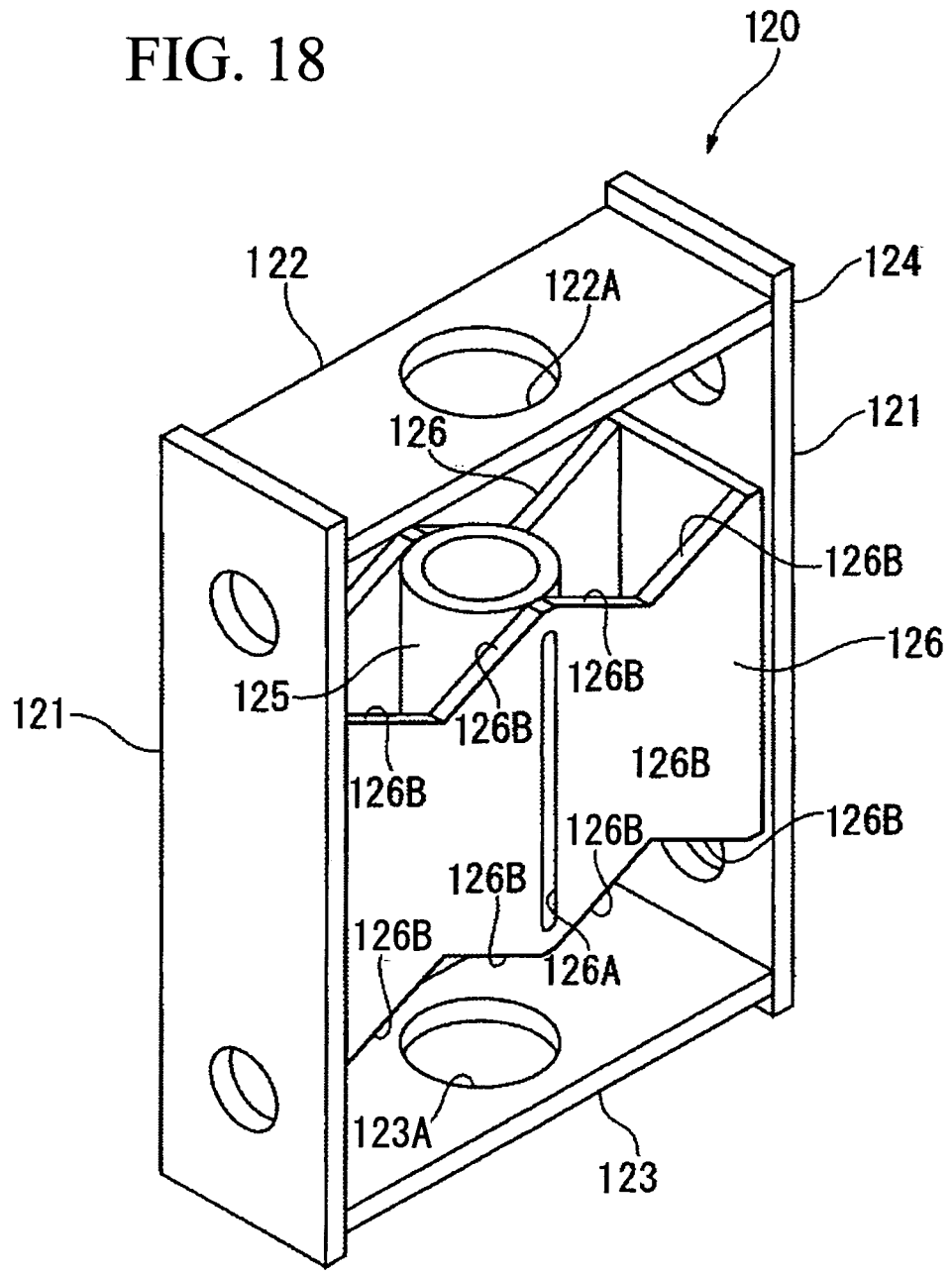
FIG. 18 is a perspective view of a metal joint according to a fifth embodiment of the present invention.
Figure 19:
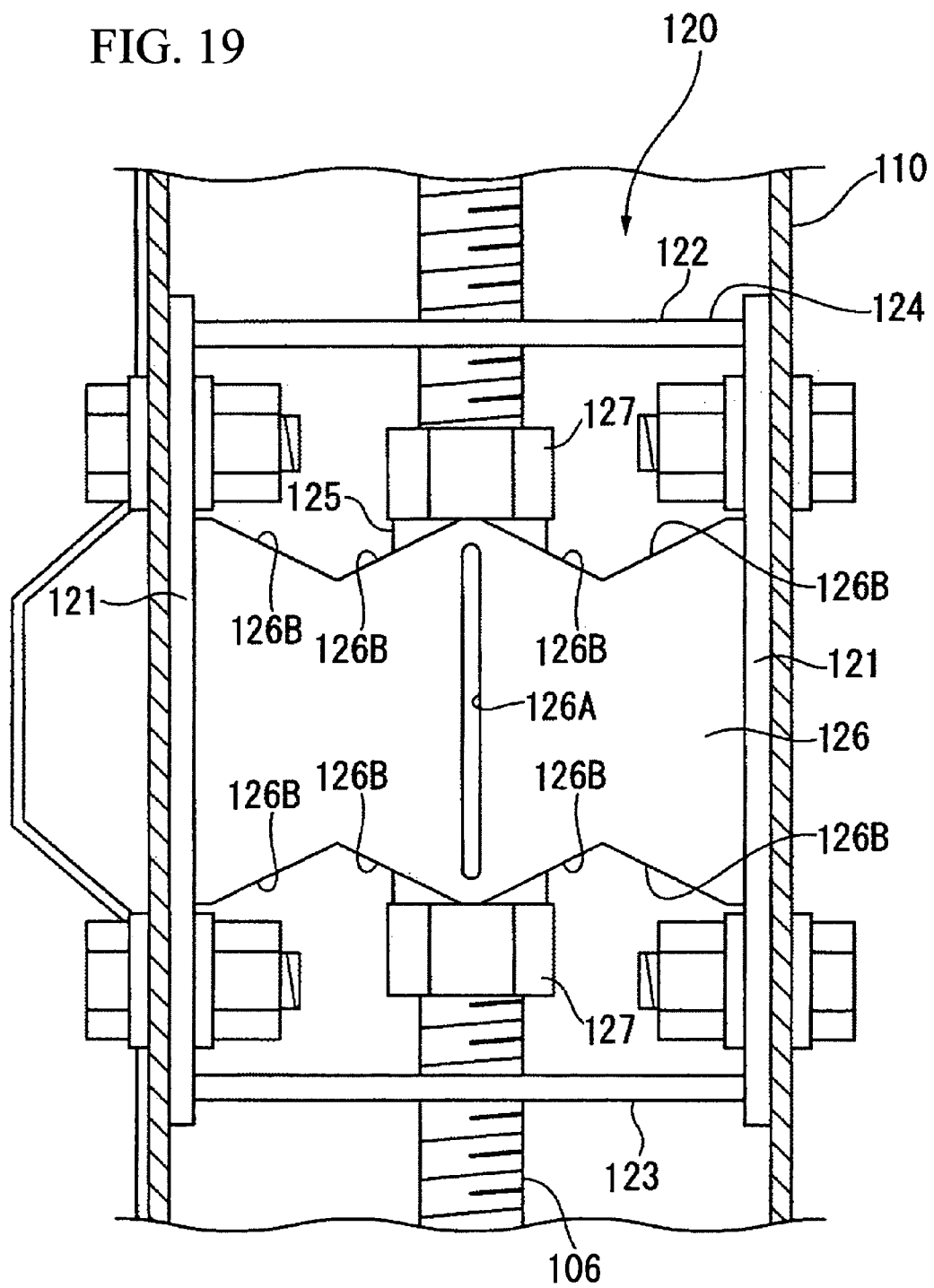
FIG. 19 is a front view of the metal joint.
Figure 20:
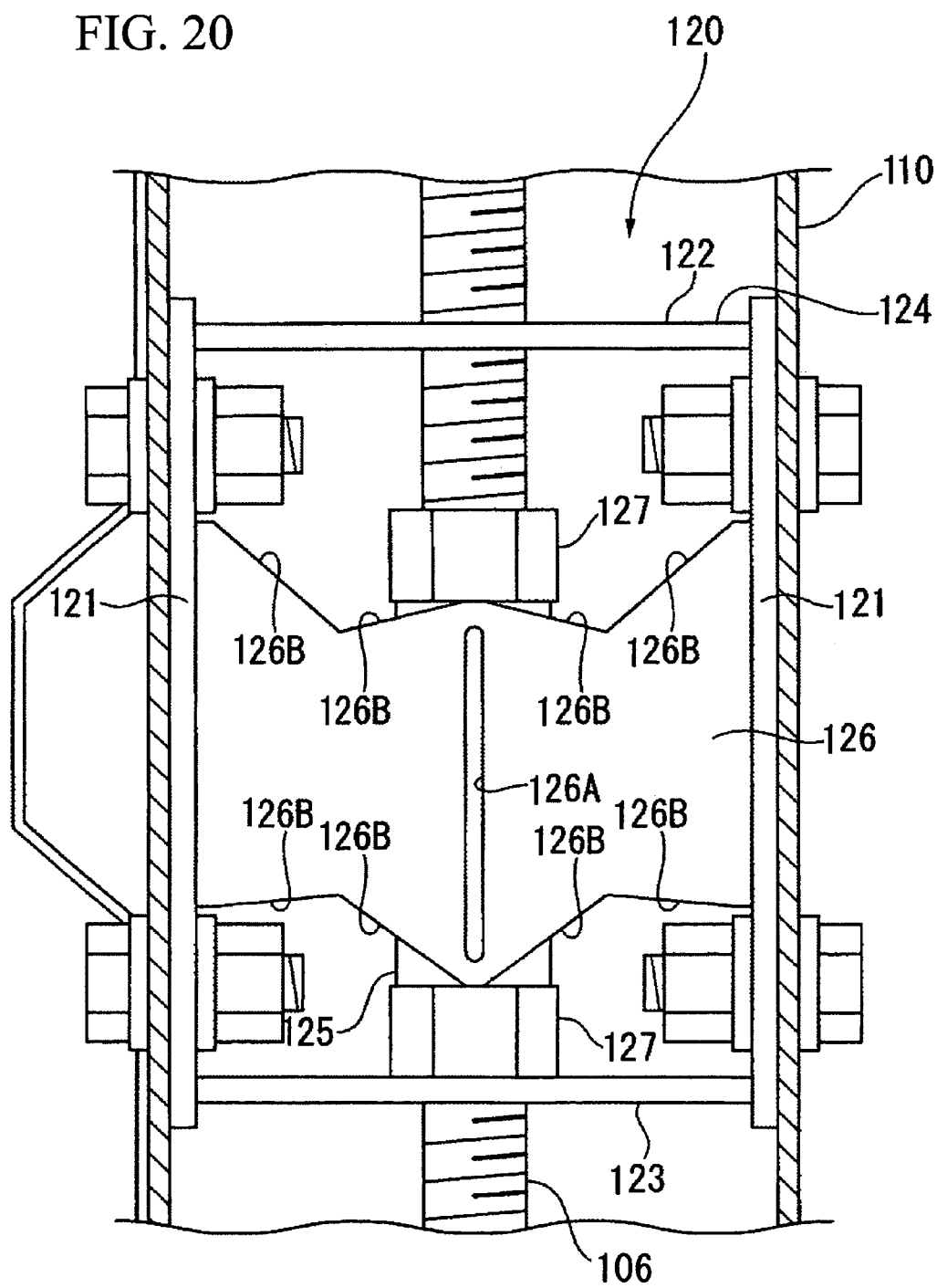
FIG. 20 is a front view showing that the metal joint is deformed.

FIG. 18 is a perspective view of metal joint 120. FIG. 19 is a front view showing that the metal joint 120 is mounted. FIG. 20 is a front view showing that the metal joint 120 is deformed.

As shown in FIGS. 18 and 19, a metal joint 120 includes connecting steel plates 121 that are a pair of second connecting parts connected to a peripheral structural member (the frame member) 110, an upper reinforcing steel member 122 that connects the upper portions of the pair of connecting steel plates 121, and a lower reinforcing steel member 123 that connects the lower portions of the pair of connecting steel plates 121. Accordingly, the metal joint 120 includes a quadrangular frame 124 that is formed by the connecting steel plates 121 and the upper and lower reinforcing steel members 122 and 123. Insertion holes 122A and 123A, into which an anchor bolt 106 is inserted, are formed substantially in the middle portions of the upper and lower reinforcing steel members 122 and 123, respectively.

A cylindrical steel member 125 that is provided between the pair of connecting steel plates 121 at a middle position, and a pair of (front and rear) damper steel plates 126 that are provided between the pair of connecting steel plates 121 with the cylindrical steel member 125 interposed therebetween are provided in the frame 124 of the metal joint 120. The cylindrical steel member 125 is a first connecting part that is connected to the anchor bolt 106. While the anchor bolt 106 is inserted into the hollow portion of the cylindrical steel member, nuts 127 are tightened from upper and lower sides, so that the anchor bolt 106 is connected to the cylindrical steel member.

The damper steel plate 126 is formed to have a substantially U-shaped cross section. Both ends of the damper steel plate are joined to the connecting steel plates 121 by welding (flare welding), and are joined to the cylindrical steel member 125 through slits 126A, which are formed in the middle portions of the damper steel plates, by welding (slot welding). That is, the damper steel plates 126 are joined to the peripheral surface of the cylindrical steel member 125 so as to extend in a tangential direction. Respective two (total four) damper steel plates are disposed between the pair of connecting steel plates 121 and the cylindrical steel member 125 so as to be substantially symmetrical with respect to the axis of the anchor bolt 106.

In the metal joint 120, the pair of connecting steel plates 121 and the cylindrical steel member 125 are disposed to face each other in a direction substantially orthogonal to the axial direction of the anchor bolt 106 (which is a vertical direction and a first direction that is a direction of the relative displacement between the pair of structures). Inclined portions 126B, which are inclined from both ends close to the connecting steel plates 121 and the cylindrical steel member 125 toward the middle portion, are formed at upper and lower edges of the damper steel plates 126 (both edges in a second direction) between the connecting steel plates 121 and the cylindrical steel member 125. That is, the length of the damper steel plate 126 in the vertical direction is small at the middle portion between the connecting steel plate 121 and the cylindrical steel member 125 as compared to both ends close to the connecting steel plate 121 and the cylindrical steel member 125.

The frame 124 is moved upward together with the peripheral structural member 110 and the cylindrical steel member 125 is pulled downward by the anchor bolt 106 as shown in FIG. 20, so that the pair of damper steel plates 126 of the metal joint 120 is sheared. In this case, the shear yield of the sheared damper steel plates 126 occurs at a predetermined shear strength. In this case, the shear strength of the damper steel plate 126 is determined depending on the length of the middle portions of the connecting steel plates 121 and the cylindrical steel member 125. The length of the both ends is set so that the bending yield of both ends close to the connecting steel plates 121 and the cylindrical steel member 125 occurs when the shear strength is increased. Accordingly, when a repeated load such as an earthquake is applied, the bending yield of both ends occurs if the shear strength of the middle portion of the damper steel plate 126 begins to be increased. Therefore, the damper steel plate is in a state where both ends are hinged. Further, the damper steel plate is deformed while drawing a hysteresis loop where a shear force born in the state where both ends are hinged is substantially upper limit strength. If being deformed in accordance with the hysteresis loop, the damper steel plate 126 may exert a damping effect (hysteretic damping) corresponding to hysteresis absorption energy.

Figure 21:
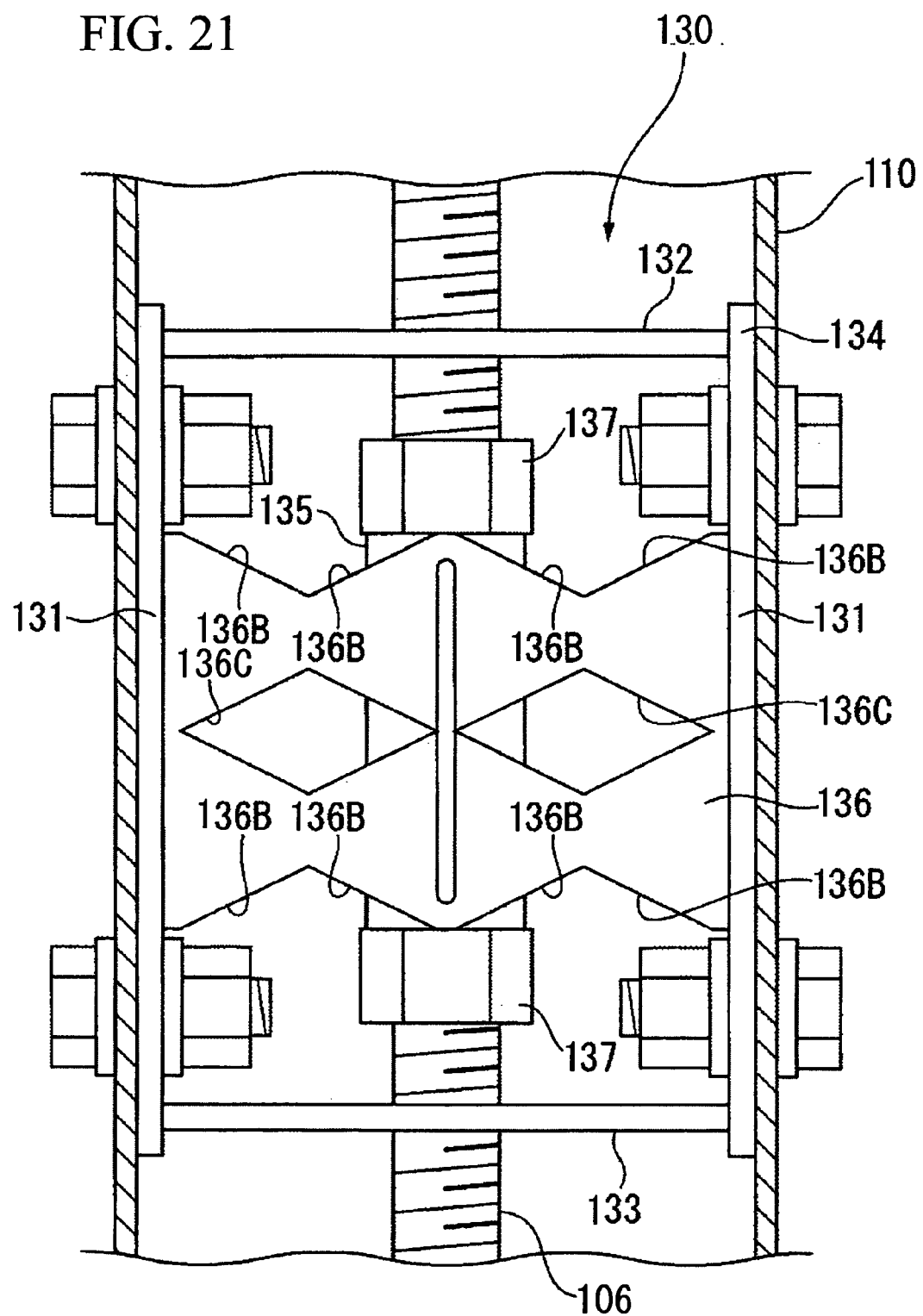
FIG. 21 is a front view showing a modification of the metal joint.

Meanwhile, the metal joint according to this embodiment is not limited to the above-mentioned construction, and may have the construction of a metal joint 130 shown in FIG. 21.

FIG. 21 is a front view of the metal joint 130 according to a modification of this embodiment.

The metal joint 130 includes a frame 134 that is formed by connecting steel plates 131 and upper and lower reinforcing steel members 132 and 133 substantially similar to those of the metal joint 120; a cylindrical steel member 135; and damper steel plates 136. The connecting steel plates 131 are fixed to a frame member 110 by bolts and nuts 137 are tightened from upper and lower sides of the cylindrical steel member 135, so that the metal joint 130 is connected to an anchor bolt 106.

In the metal joint 130, inclined portions 136B, which are inclined from both ends close to the connecting steel plates 131 and the cylindrical steel member 135 toward the middle portion, are formed at upper and lower edges of the damper steel plates 136. Further, substantially rhombic notched holes 136C are formed at the middle positions of the damper steel plates in a vertical direction. The rhombic notched hole 136C is formed so that one diagonal line of the rhombic notched hole is parallel to a vertical direction (first direction), the other diagonal line is parallel to a horizontal direction (second direction), and an inclination angle of each side is substantially equal to that of the inclined portion 136B. That is, the damper steel plate 136 of the metal joint 130 is divided into upper and lower portions by the notched holes 136C. Each of the divided portions exerts a damping effect by the bending-shear yield thereof, like the above-mentioned damper steel plate 126. Meanwhile, the metal joint 130 is limited to the construction where the notched holes 136C are formed in the vertical direction one by one, and may have construction where two or more notched holes 136C are formed side by side in the vertical direction.

According to this embodiment that has been described above, the following various effects may be obtained.

That is, in the metal joints 120 and 130, the damper steel plates 126 and 136 have a specific shape so that the bending yield and the shear yield occur. As a result, even though a repeated load is applied after the shear yield of the damper steel plates 126 and 136, the increase of the shear strength thereof may be suppressed and stress exceeding design shear strength is not generated. Accordingly, the stress, which is applied to the connecting steel plates 121 and 131 or the peripheral structural member 110 of the metal joints 120 and 130, does not exceed a design value, and the breakage of each of them may be prevented. In addition, since the increase of the rigidities of the damper steel plates 126 and 136 may be suppressed, a vibration-suppression effect expected from design may be obtained by a damping effect (energy absorption) of the damper steel plates 126 and 136 without the increase of the input energy of an earthquake or the like.

Further, in the metal joint 120 or 130, the connecting steel plates 121 or 131 are disposed on left and right sides while making a pair, and the damping members (the damper steel plates 126 or 136) are disposed substantially symmetrically with respect to the axis of the anchor bolt 106. As a result, it is possible to prevent the generation of load stress, which is caused by the eccentricity when a damping effect is exerted. In addition, since load stress is not generated, the dynamic mechanism of the damper steel plates 126 or 136 becomes clear and a damping effect is reliably and appropriately exerted, so that vibration energy caused by an earthquake or the like may be effectively absorbed.

Further, since the damper steel plates 126 and 136 are disposed in the metal joints 120 and 130, the damper steel plates 126 or 136 do not need to be directly welded to the peripheral structural member 110. For this reason, the metal joint 120 or 130 may be easily installed, so that workability may be improved. In addition, the metal joint 120 or 130 may be easily separated from the peripheral structural member 110, so that maintainability, such as check or replacement after an earthquake, may be improved.

In the metal joint 120 or 130, the pair of connecting steel plates 121 or 131 is connected to each other by the upper reinforcing steel member 122 or 132 and the lower reinforcing steel member 123 or 133 so as to form the frame 124 or 134, and the damper steel plates 126 or 136 and the cylindrical steel member 125 or 135 are disposed in the frame. Since this construction is employed, the deformation of the connecting steel plates 121 or 131 may be prevented when bending moment is applied to the connecting steel plates 121 or 131 from the damper steel plates 126 or 136. In addition, the anchor bolt 106 is inserted into the insertion holes 122A and 123A that are formed at the upper reinforcing steel member 122 or 132 and the lower reinforcing steel member 123 or 133, so that the eccentricity between the anchor bolt 106 and the frame 124 or 134 may not be generated. As a result, since it is possible to prevent the generation of load stress that is caused by the eccentricity, a damping effect of the damper steel plates 126 or 136 may be exerted.

Meanwhile, the inclined portions 136B and the notched holes 136C have been formed at the damper steel plates 136 in this embodiment. However, instead of the inclined portions and the notched holes (or together with these structures), the construction where the thickness of the damper steel plate 136 is small at the middle position in a width direction as compared to other positions may be employed. The same effect as this embodiment may be obtained even in this case.

Sixth Embodiment

Metal joints 140 and 140A according to a sixth embodiment of the present invention will be described below with reference to FIGS. 22 and 23.

Figure 22:
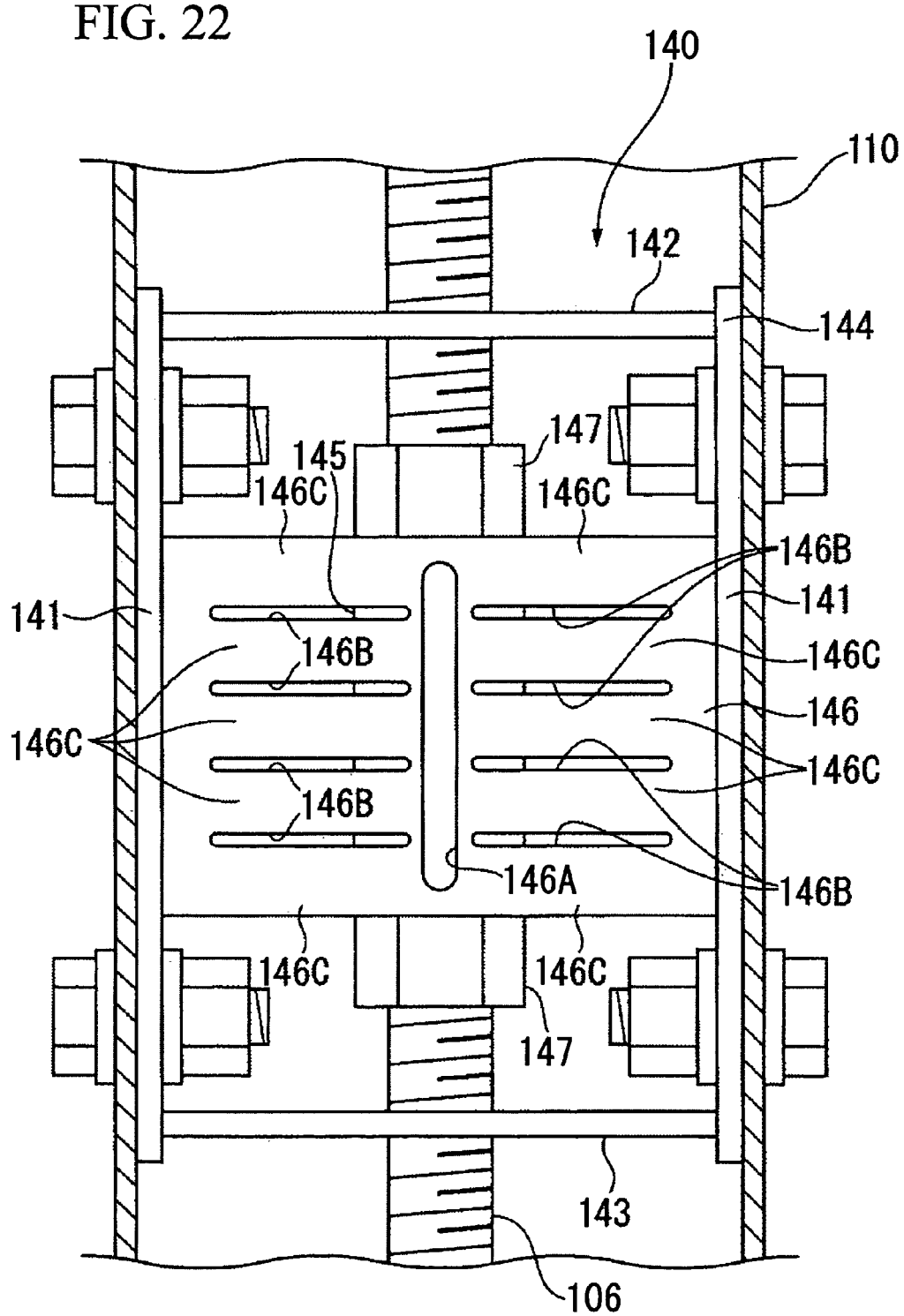
FIG. 22 is a front view of a metal joint according to a sixth embodiment of the present invention.
Figure 23:
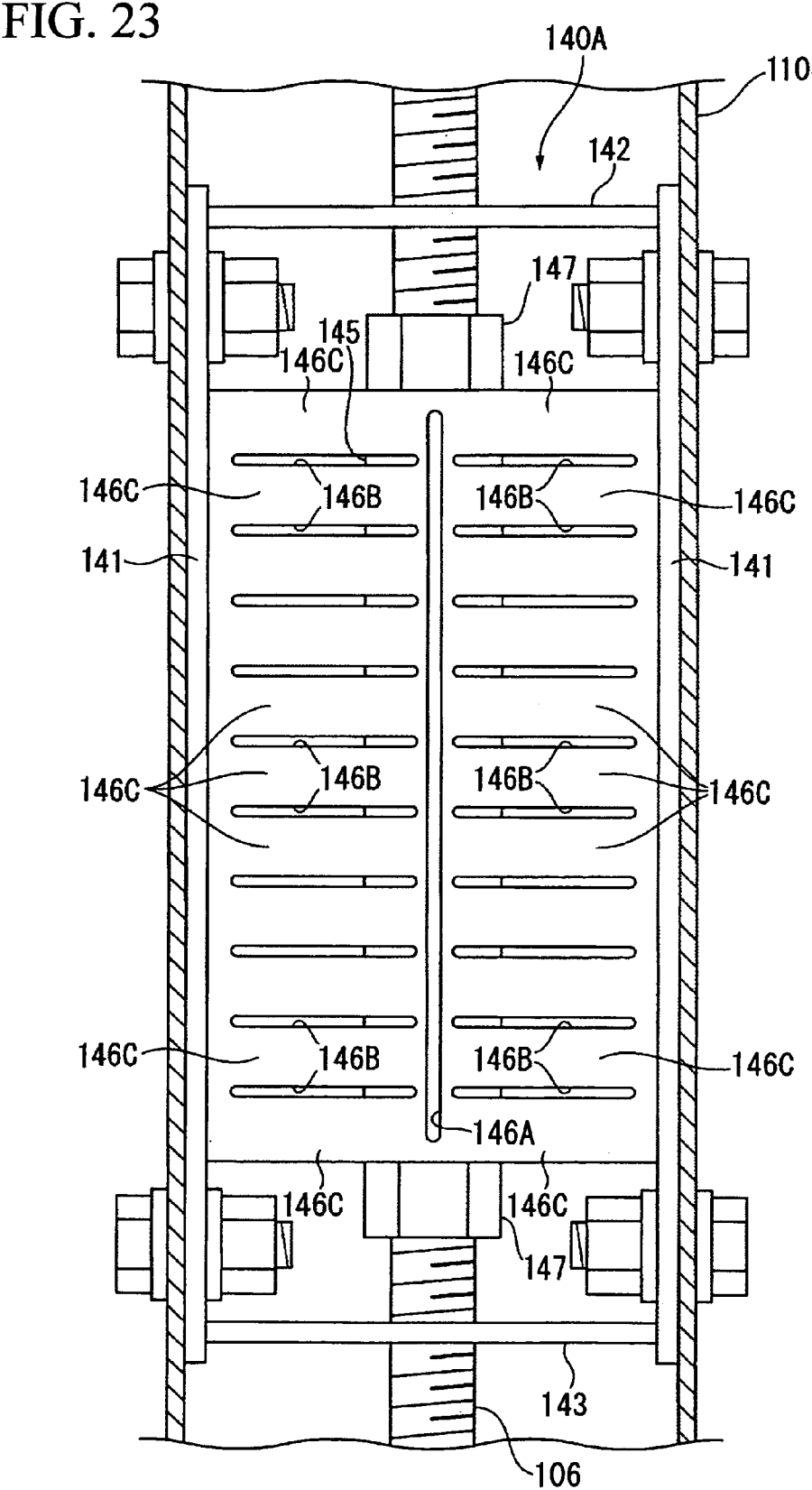
FIG. 23 is a front view showing a modification of the metal joint.

FIGS. 22 and 23 are front views of the metal joints 140 and 140A according to this embodiment, respectively.

Each of the metal joints 140 and 140A includes a frame 144 that is formed by connecting steel plates 141 and upper and lower reinforcing steel members 142 and 143 substantially similar to those of the metal joint 120; a cylindrical steel member 145; and damper steel plates 146. The connecting steel plates 141 are fixed to a peripheral structural member 110 by bolts and nuts 147 are tightened from upper and lower sides of the cylindrical steel member 145, so that each of the metal joints 140 and 140A is connected to the anchor bolt 106.

In the metal joints 140 and 140A, the damper steel plates 146 are formed in the shape of a rectangular plate as a whole, are joined to the pair of connecting steel plates 141 by welding (flare welding), and are joined to the cylindrical steel member 145 through slits 146A, which are formed in the middle portions of the damper steel plates, by welding (slot welding). A plurality of slits 146B, which extends in the horizontal direction (second direction) between the connecting steel plates 141 and the cylindrical steel member 145 and passes through the damper steel plates 146, is formed at the damper steel plates 146. Divide steel plate portions 146C of the damper steel plate 146 divided by the slits 146B are adjacent to each other in a vertical direction. The length of the divide steel plate portions 146C in the vertical direction is set to the same length, and is set so that the bending yield occurs at both ends of the divide steel plate portions 146C close to the connecting steel plates 141 and the cylindrical steel member 145 when the shear yield of each of the divide steel plate portions 146C occurs and the shear strength is increased due to a repeated load.

In the metal joints 140 and 140A, each of the divide steel plate portions 146C exerts a damping effect by the bending-shear yield thereof. In this case, the bending yield of both ends of each divide steel plate portion occurs, so that each of the divide steel plate portions 146C is in a state where both ends are hinged. Further, the divide steel plate portion is deformed while drawing a hysteresis loop where a shear force born in the state where both ends are hinged is substantially upper limit strength. Meanwhile, the metal joints 140 and 140A are different from each other in terms of the height of the damper steel plate 146 and the number of the divide steel plate portions 146C, and are the same as each other in terms of the shape (length relationship) of each of the divide steel plate portions 146C. That is, a shear force (damping effect) born by the entire damper steel plate 146 of the metal joint 140A is set large, but a bending-shear yield property of each of the divide steel plate portions 146C is common to the metal joints 140 and 140A. Accordingly, according to the metal joints 140 and 140A, substantially the same effect as the fifth embodiment may be obtained.

Seventh Embodiment

A metal joint 150 according to a seventh embodiment of the present invention will be described below with reference to FIG. 24.

Figure 24:
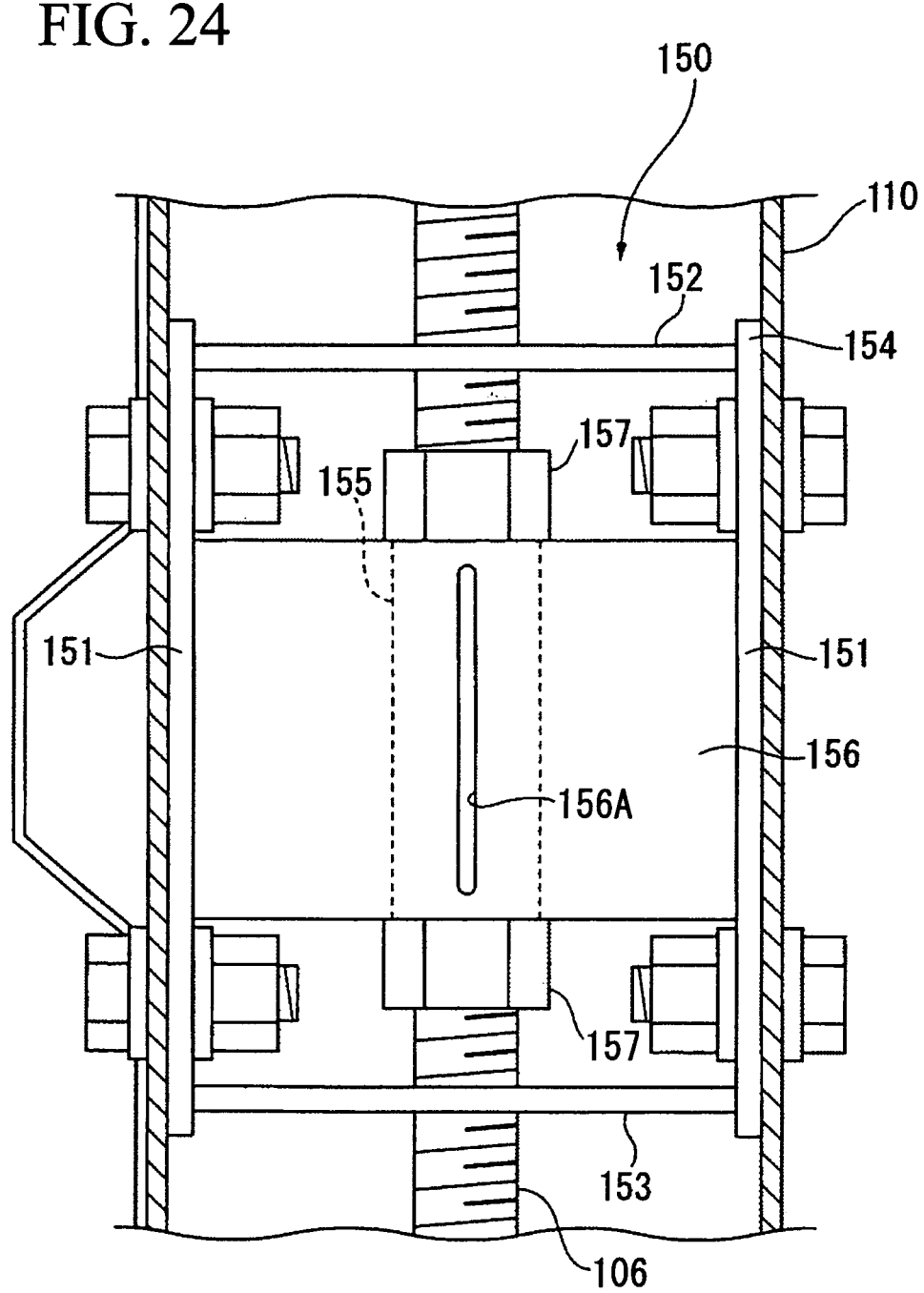
FIG. 24 is a front view of a metal joint according to the sixth embodiment of the present invention.

FIG. 24 is a front view of the metal joint 150 according to this embodiment.

The metal joint 150 includes a frame 154 that is formed by connecting steel plates 151 and upper and lower reinforcing steel members 152 and 153 substantially similar to those of the metal joint 120; a cylindrical steel member 155; and damper steel plates 156. The connecting steel plates 151 are fixed to a peripheral structural member 110 by bolts and nuts 157 are tightened from the upper and lower sides of the cylindrical steel member 155, so that the metal joint 150 is connected to an anchor bolt 106.

In the metal joint 150, the damper steel plates 156 are formed in the shape of a rectangular plate as a whole, are joined to the pair of connecting steel plates 151 by welding (flare welding), and are joined to the cylindrical steel member 155 through slits 156A, which are formed in the middle portions of the damper steel plates, by welding (slot welding). The damper steel plate 156 is installed on the bearing wall (the frame member) 110 after plastic working or are formed of a steel member on which precipitation hardening has been performed (precipitation hardened steel). The plastic working is to previously shear the steel member from an initial position shown in FIG. 24 in a vertical direction (first direction) by a predetermined amount of deformation, and to make the steel member, where the shear yield has occurred, return to the initial position. That is, a yield strength ratio of the damper steel plate 156 is set to 2/3 or more or a yield strength range thereof is set within ±20% by performing plastic working on the damper steel plate 156 or by using precipitation hardened steel. Accordingly, the increase of the strength of the damper steel plate 156 after the shear yield is suppressed, and the damper steel plate is deformed while drawing a hysteresis loop where predetermined shear strength does not exceed an upper limit. Therefore, according to the metal joint 150, substantially the same effect as the fifth embodiment may be obtained.

Eighth Embodiment

A metal joint 160 according to an eighth embodiment of the present invention will be described below with reference to FIGS. 25 to 28.

Figure 25:
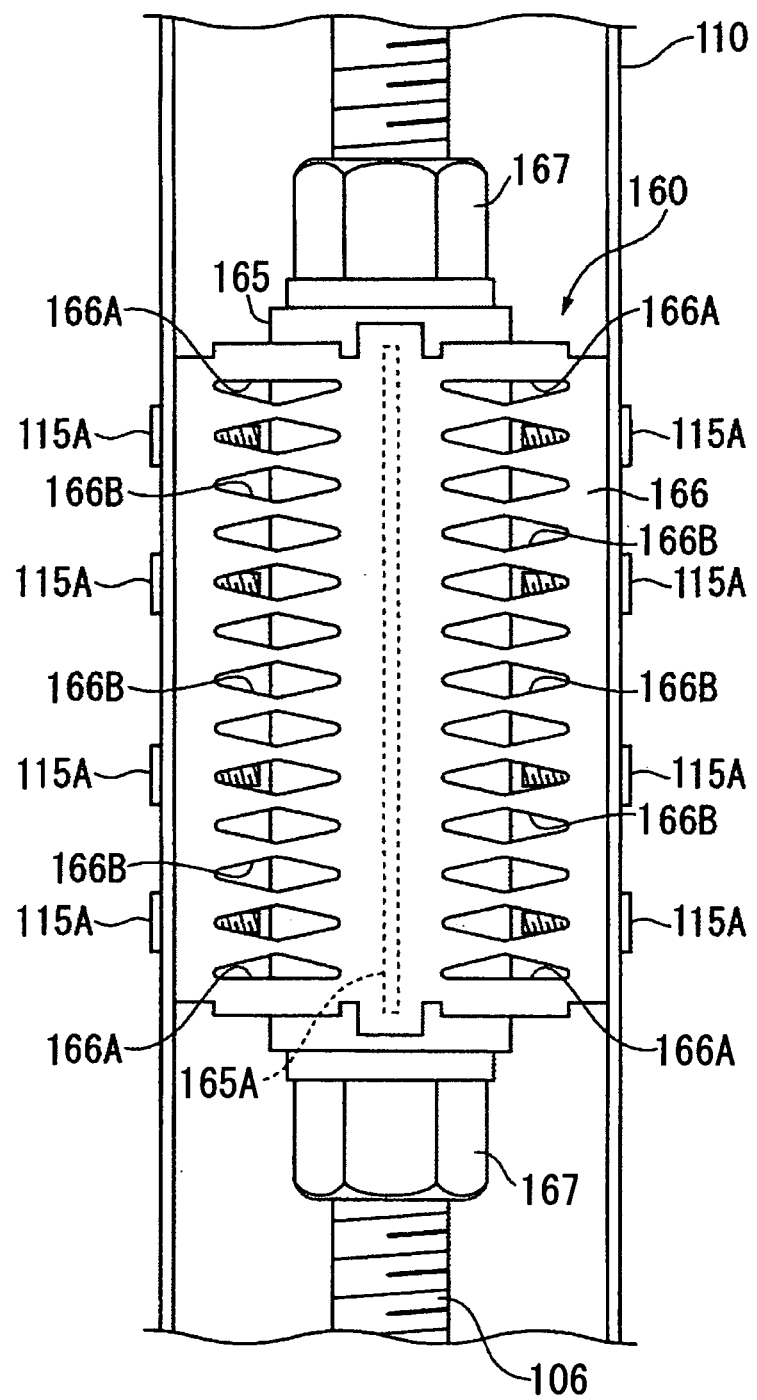
FIG. 25 is a front view of a metal joint according to a seventh embodiment of the present invention.
Figure 26:
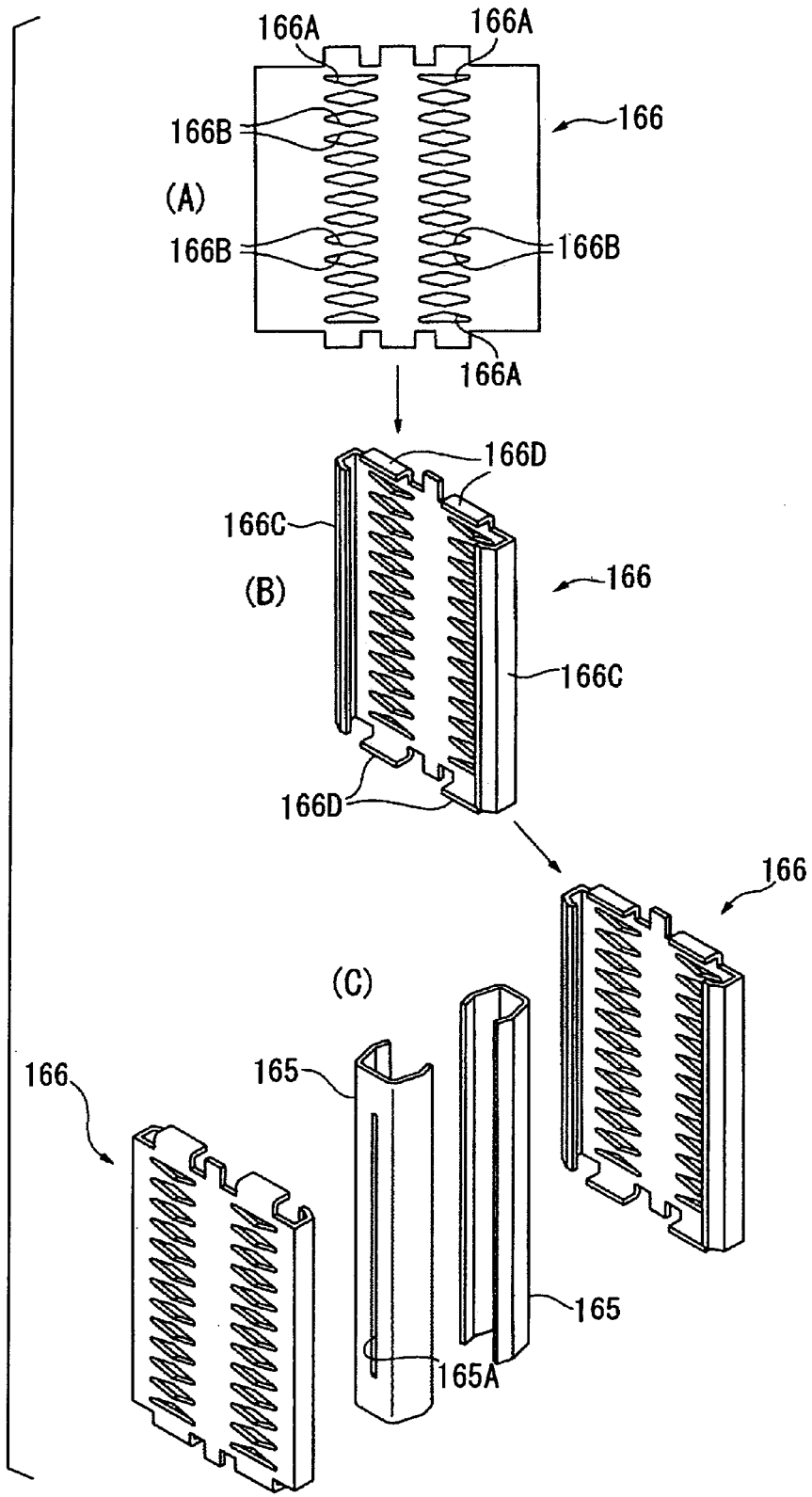
FIG. 26 is a perspective view illustrating a procedure for manufacturing the metal joint.
Figure 27:
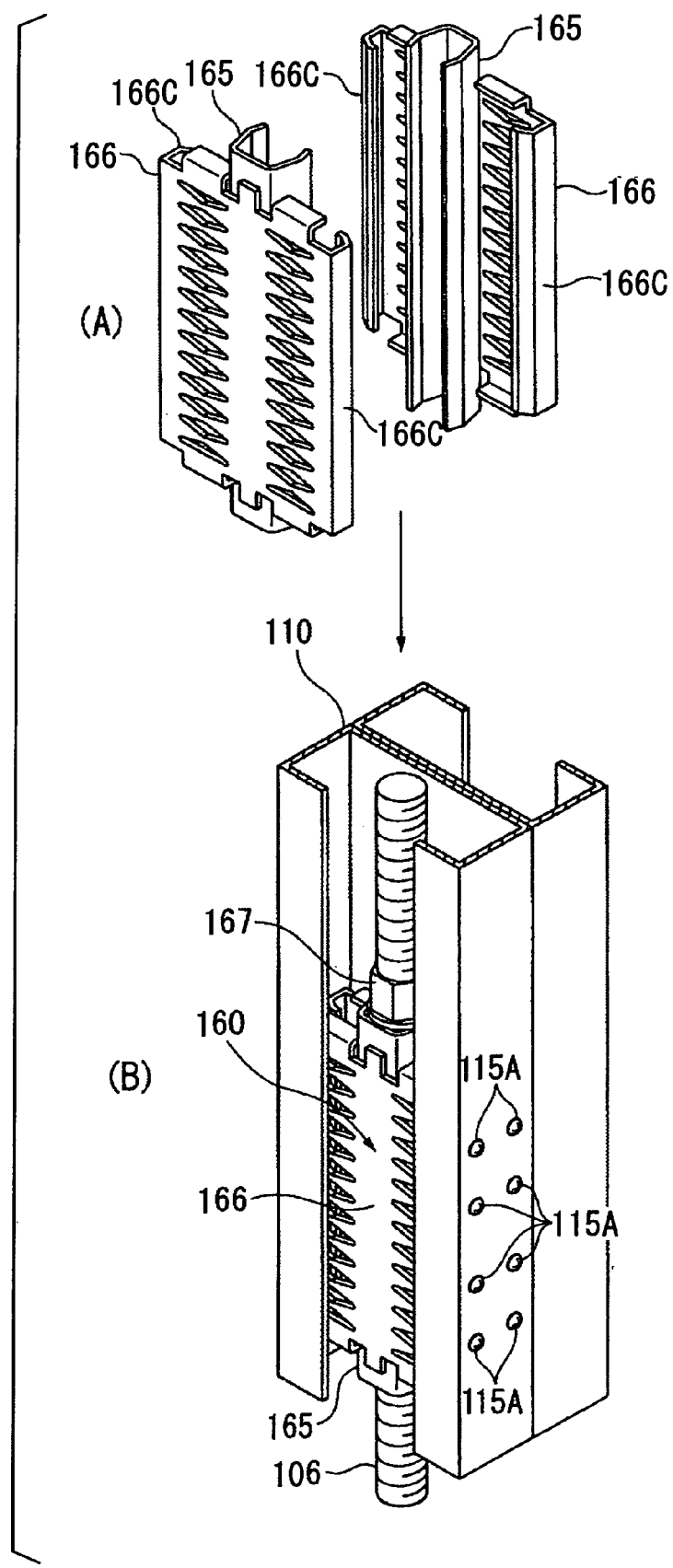
FIG. 27 is a perspective view illustrating a procedure for mounting the metal joint.
Figure 28:
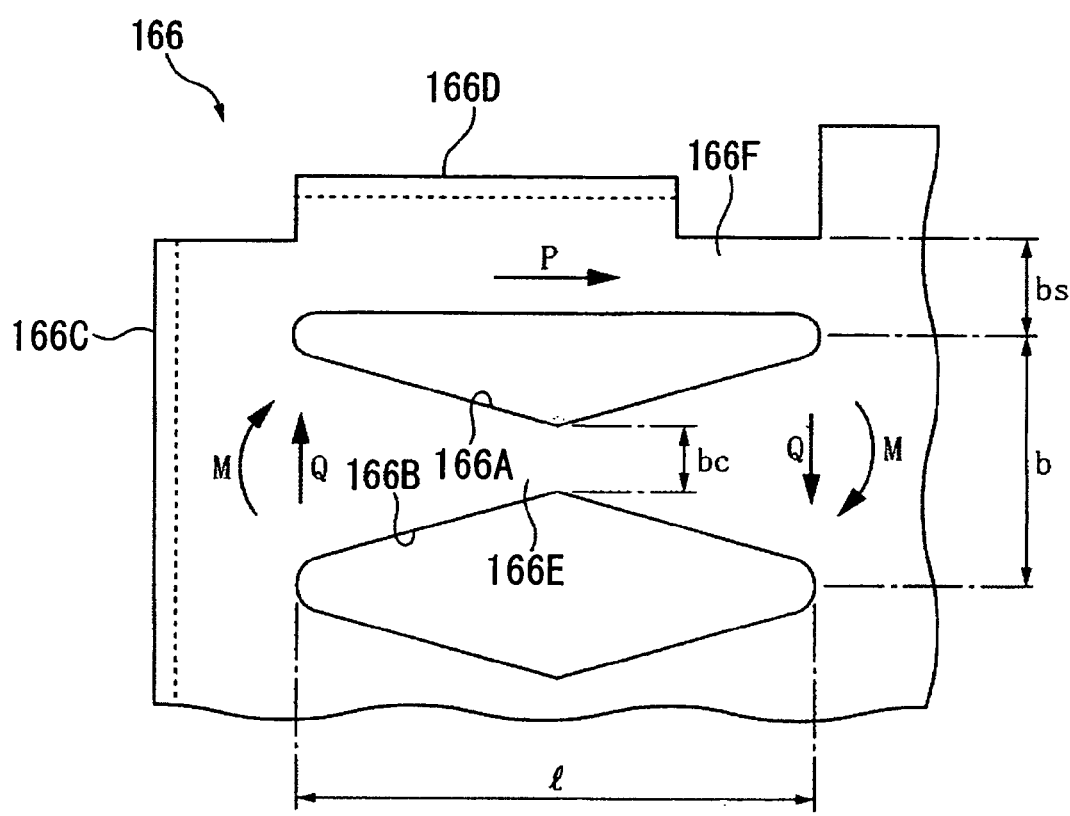
FIG. 28 is a partially enlarged view showing detail construction of the metal joint.

FIG. 25 is a front view of the metal joint 160 according to the eighth embodiment. FIGS. 26A to 26C and FIGS. 27A and 27B are perspective views illustrating procedures for manufacturing and mounting the metal joint 160. FIG. 28 is a front view showing the detailed structure of the metal joint 160.

The metal joint 160 includes a pair of U-shaped steel members 165 that is first connecting parts connected to an anchor bolt 106, and a pair of damper steel plate 166 that is welded to the U-shaped steel members 165. Fixing pieces 166C, which are first connecting parts formed at side edges of the damper steel plate 166, are fixed to a peripheral structural member 110 by drill screws 115A, and the metal joint 160 is connected to the anchor bolt 106 by nuts 167 that are provided on the upper and lower sides of the U-shaped steel member 165. Further, first slits 166A that are formed at upper and lower ends of the damper steel plate, and a plurality of second slits 166B that is formed side by side between the first slits 166A are formed at the damper steel plate 166. The lines, which are formed by the first and second slits 166A and 166B, form two lines that are symmetrically disposed on left and right sides.

As for the damper steel plate 166 of the metal joint 160, the first and second slits 166A and 166B are formed at a steel plate by laser drilling as shown in FIG. 26A. After that, the fixing pieces 166C are formed by folding or bending side edges as shown in FIG. 26B, and bent pieces 166D are formed by folding or bending protrusions of the upper and lower edges. Further, the U-shaped steel member 165 is a long steel member that has a substantially U-shaped cross section as shown in FIG. 26C. A slit 165A is formed in a longitudinal direction on the side surface of the U-shaped steel member 165, and the U-shaped steel member 165 is joined to the damper steel plate 166 through the slit 165A by slot welding. Further, as shown in FIG. 27A, a set of the U-shaped steel members 165 and the damper steel plates 166, which are joined to each other by welding, are prepared and installed on the peripheral structural member 110, and the anchor bolt 106 is inserted between the pair of U-shaped steel members 165. After the U-shaped steel members and the damper steel plates are installed as described above, the drill screws 115A are threadably mounted on the fixing pieces 166C of the damper steel plates 166 from the outside of the peripheral structural member 110. In addition, the nuts 167 provided on the anchor bolt 106 are tightened and the U-shaped steel members 165 are connected to the anchor bolt 106, so that the metal joint 160 is completely manufactured and mounted.

The detailed structure of the damper steel plate 166 will be described below with reference to FIG. 28.

The horizontal length (that is, the length "l" of divide steel plate portions 166E) of the first and second slits 166A and 166B is set to the same length, the first slit 166A has an inclination so that the height of the first slit is increased toward the second slit 166B from both ends to the middle portion, and the second slit 166B has an inclination so that the height of the second slit is symmetrically increased in a vertical direction from both ends to the middle portion.

That is, the divide steel plate portion 166E of the damper steel plate 166, which is positioned between the first and second slits 166A and 166B, is formed in a substantially rhombic shape so that the length "bc" of the middle portion is smaller than the length "b" of both ends. The shape of the divide steel plate portion 166E is set to the dimension that is defined by the following expressions (1) and (2). Further, the length "bs" of a stiffener portion 166F, which is formed at an upper or lower end of the first slit 166A of the damper steel plate 166, is set to the dimension that is defined by the following expression (3).

$$M/Z < \sigma y \qquad \text{Expression (1)}$$

Here, M denotes bending moment that is applied to both ends of the divide steel plate portion 166E, Z denotes a section modulus at both ends of the divide steel plate portion 166E, and "$Z = t \cdot b^2 / 6$" is satisfied (t demotes the thickness of the damper steel plate 166). Further, σy denotes the tensile yield stress of the damper steel plate 166.

$$1.5 Q/A < \tau y \qquad \text{Expression (2)}$$

Here, Q denotes a shear force that is applied to the divide steel plate portion 166E, A denotes the sectional area in the middle portion of the divide steel plate portion 166E, and "$A = t \cdot bc$" is satisfied. Further, τy denotes the shear yield stress of the damper steel plate 166.

$$P/(t \cdot bs) < \sigma y \qquad \text{Expression (3)}$$

Here, P denotes a tensile or compressive force that is applied to the stiffener portion 166F, and is obtained by M/b.

According to Expressions (1) and (2), while the bending moment M and the shear force Q are applied to the divide steel plate portion 166E as shown in FIG. 28, the shear yield occurs in the middle portion of the divide steel plate portion 166E and the bending yield occurs at both ends thereof. A dimensional ratio between the length "b" of both ends of the divide steel plate portion 166E and the length "bc" of the middle portion thereof, which satisfies this relationship, is calculated.

Further, according to Expression (3), the length "bs" of the stiffener portion 166F, which does not make the tensile or compressive yield occur by a tensile or compressive force P applied to the stiffener portion 166F as shown in FIG. 28, is calculated.

Furthermore, as conditions that are required for suppressing the increase of the strength of the divide steel plate portion and securing the deformability of the divide steel plate portion 166E after the bending yield, it is preferable that the following expressions (4) and (5) be satisfied.

$$b/t < 10 \qquad \text{Expression (4)}$$

$$l/b > 3 \qquad \text{Expression (5)}$$

If a ratio (width-thickness ratio) between the length "b" of both ends of the divide steel plate portion 166E and the thickness "t" of the damper steel plate is set so as to satisfy Expression (4), the unstable behavior of the divide steel plate portion 166E may be suppressed and the deformability of the divide steel plate portion after the bending yield may be improved. Further, if a ratio between the length "l" of the divide steel plate portion 166E and the length "b" of both ends thereof is set so as to satisfy Expression (5), the shear yield of the end may be suppressed and the increase of the strength may be suppressed.

In this metal joint 160, if the bending yield of each of the divide steel plate portions 166E occurs, each of the divide steel plate portions is in a state where both ends are hinged and is deformed while drawing a hysteresis loop where a shear force born in the state where both ends are hinged is substantially upper limit strength. Accordingly, a stable damping effect where the increase of strength is suppressed may be exerted.

Figure 29A:
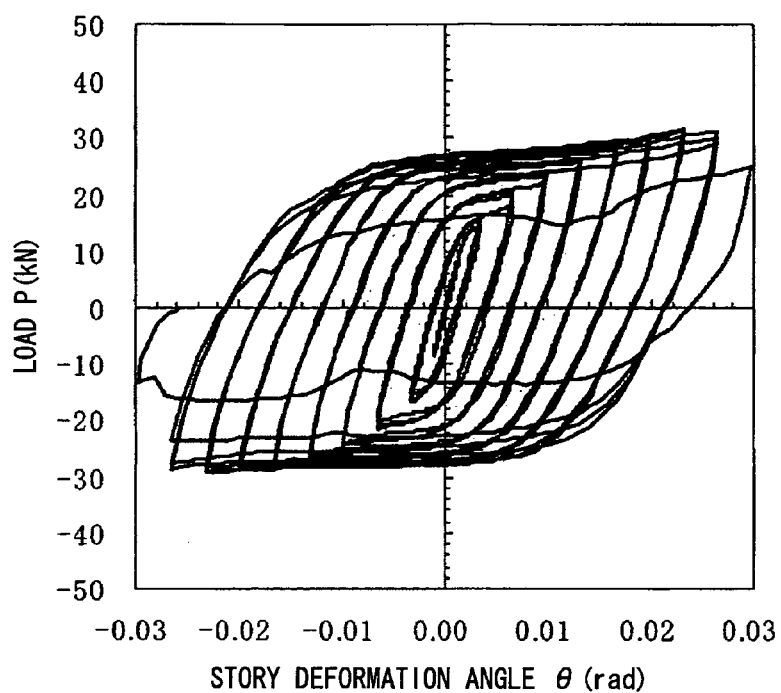
FIG. 29A is a graph showing loading test results of the metal joint according to the present invention.
Figure 29B:
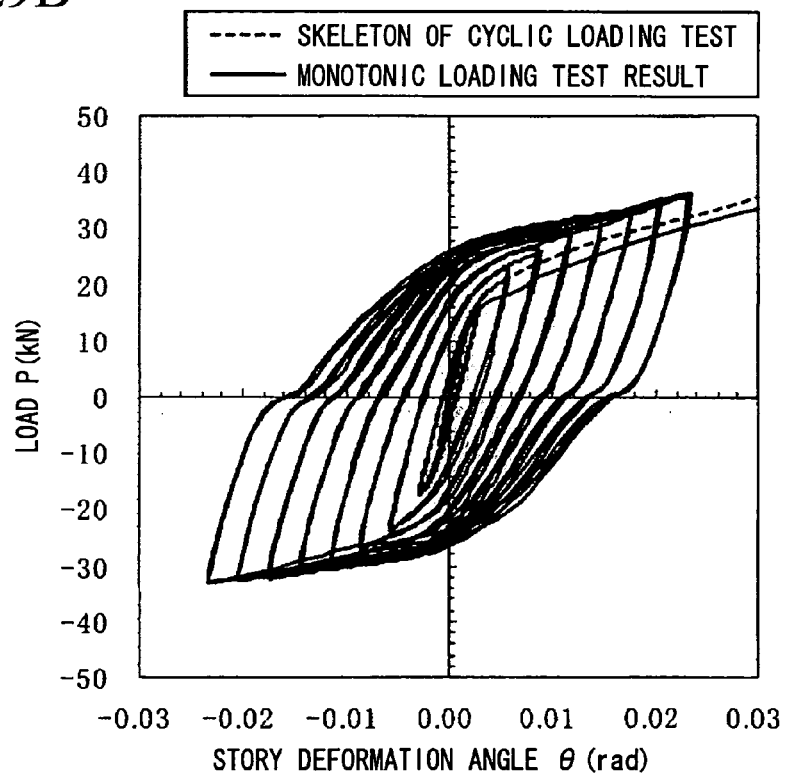
FIG. 29B is a graph showing loading test results of a metal joint according to a comparative example.
Figure 30A:
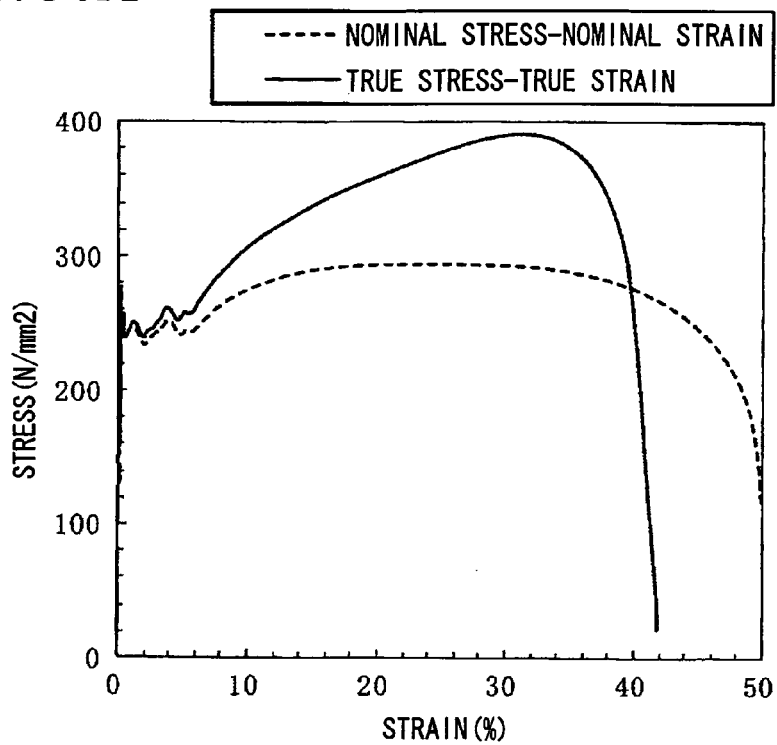
FIG. 30A is a graph showing a stress-strain relationship when a steel member is bent and sheared (in the case of tensile (bending) yield).
Figure 30B:
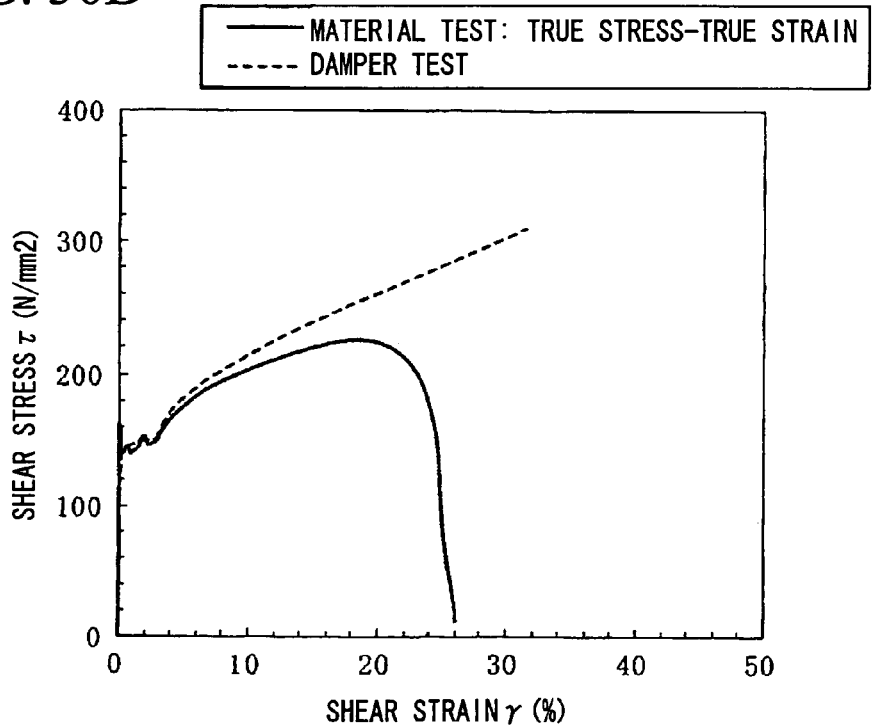
FIG. 30B is a graph showing a stress-strain relationship when a steel member is bent and sheared (in the case of pure shear).

Specifically, FIGS. 29A and 29B show the cyclic loading test results when the metal joints 120, 130, 140, 140A, 150, and 160 according to the above-mentioned embodiments are used.

FIG. 29A is a graph showing the test results of the metal joint according to the present invention, and FIG. 29B is a graph showing the test results of a metal joint according to a comparative example.

A horizontal axis of the graph represents a story deformation angle θ. The story deformation angle is a value that is obtained by dividing the displacement of upstairs and downstairs by a distance (height) between the upstairs and downstairs. The unit of the story deformation angle is radian.

Here, since the bending yield of the damper steel plate is to occur in the metal joint according to the present invention, the increase of strength is suppressed. In contrast, ribs are formed at upper and lower edges of the damper steel plate in the metal joint according to the comparative example so that the bending yield does not occur.

The increase of strength is suppressed in the case of the metal joint according to the present invention that is shown in FIG. 29A, so that a stable hysteresis loop having a large area is drawn. Accordingly, it could be confirmed that large hysteretic damping was obtained. Meanwhile, strength is gradually increased in the case of the metal joint according to the comparative example that is shown in FIG. 29B. In addition, it can be seen that strength is further increased in the case of cyclic loading as compared to monotonic loading.

According to the metal joint of the present invention, from the above description, it is possible to achieve a metal joint that suppresses the increase of strength and is excellent in energy absorption performance. Therefore, it is possible to achieve a metal joint that can effectively suppress the vibration of a building.

Meanwhile, the present invention is not limited to the above-mentioned embodiments, and includes other construction that can achieve the object of the present invention. The following modifications are also included in the present invention.

Arbitrary various steel members (steel members for building structural use or steel members for machine structural use) may be used as a steel member that forms each of the members of the metal joints 120, 130, 140, 140A, 150, and 160. However, a steel member, which is excellent in deformability, is preferably used as a steel member for the damper steel plates 126, 136, 146, and 156 that exert hysteretic damping after yield. As for the deformability of the damper steel plate, it is preferable that strength not be decreased until the relative displacement between the first and second connecting parts exceeds 10 mm.

Further, in the fifth and eighth embodiments, the divide steel plate portion has been formed in a substantially rhombic shape so that the length of the middle portion is smaller than the length of both ends. However, the present invention is not limited thereto. The thickness of the middle portion of the damper steel plate may be smaller than the thickness of both ends thereof, and the width and thickness of the middle portion of the damper steel plate may be smaller than the width and thickness of both ends thereof.

The preferred structure, the preferred method, and the like for carrying out the present invention have been disclosed above, but the present invention is not limited thereto. That is, specific embodiments of the present invention have mainly been shown and described. However, those skilled in the art can modify the shape, the material, the number of members, and other detailed construction of the above-mentioned embodiment in various ways without departing from the scope and spirit of the present invention.

Accordingly, the descriptions limiting the above-mentioned shape, material, and the like are illustrative for the purpose of easy understanding of the present invention, and do not limit the present invention. Therefore, the descriptions of names of members except for the partial or entire limitation on the shape, material, and the like are included in the present invention.

INDUSTRIAL APPLICABILITY

According to the present invention, it is possible to provide a metal joint that can sufficiently exert a vibration-suppression effect for effectively absorbing energy of an earthquake and is excellent in mountability or maintainability, and a building including the metal joints.

The invention claimed is:

1. A metal joint that is mounted between a pair of structures, and exerts a damping effect by yielding in accordance with a relative displacement between the pair of structures, the metal joint comprising:

a first connecting part that is connected to one of the structures;

a second connecting part that is connected to the other of the structures; and a damping member that is connected between the first connecting part and the second connecting part, wherein the first and second connecting parts are disposed at positions that face each other in a direction substantially orthogonal to a direction of the relative displacement generated between the pair of structures;

the second connecting part is provided with a pair of connecting members disposed at symmetrical positions between which the first connecting part is interposed;

the damping member exerts the damping effect in accordance with the relative displacement that is generated between the pair of structures;

one edge and an other edge of the connecting members are connected to each other by a first reinforcing steel member and a second reinforcing steel member, respectively;

the first connecting part comprises a cylindrical steel member into which an anchor member, which is one of the pair of structures, is inserted;

the anchor member inserted into the cylindrical steel member is fixed to both ends of the cylindrical steel member through a nut; and when the direction of the relative displacement is defined as a first direction and a direction where the first and second connecting parts face each other is defined as a second direction, the damping member is a damper steel plate that is provided substantially parallel to a plane that includes the first and second directions;

the damper steel plate is a pair of damper steel plates which are substantially axisymmetrically disposed with the first connecting part interposed therebetween;

when a length of the damper steel plate in the first direction is seen in the second direction, a length of a middle portion of the damper steel plate is shorter than a length of both ends of the damper steel plate, and a size of the damper steel plate is set so that equations (a), (b), (c) and (d) are satisfied, $$M/Z < \sigma y \quad (a),$$

$$(1.5 \times Q)/A < \tau y \quad (b),$$

$$b/t < 10 \quad (c),$$

$$l/b > 3 \quad (d),$$

wherein:
- M denotes a bending moment that is applied to the both ends in the second direction of the damper steel plate,
- Z denotes a section modulus at the both ends in the second direction of the damper steel plate,
- σy denotes a tensile yield stress of the damper steel plate,
- Q denotes a shear force that is applied to the damper steel plate,
- A denotes a sectional area in the middle portion in the second direction of the damper steel plate,
- τy denotes a shear yield stress of the damper steel plate,
- b denote a width of the both ends of the damper steel plate,
- t denote a thickness of the damper steel plate, and
- l denote the length of the damper steel plate in the first direction.

2. The metal joint according to claim, wherein: when the thickness of the damper steel plate is seen in the second direction, the middle portion of the damper steel plate is thinner than both ends of the damper steel plate, and a thickness of said both ends is set so that the bending yield of both ends occurs when shear strength determined by a thickness of the middle portion is increased.

3. The metal joint according to claim 2, wherein: the length and the thickness of said both ends are set so that the bending yield of said both ends occurs when shear strength determined by the length and the thickness of the middle portion is increased.

4. The metal joint according to claim 1, wherein inclined portions, which are inclined from both ends of the damper steel plate toward the middle portion of the damper steel plate are formed at said both ends of the damper steel plate.

5. The metal joint according to claim 1, wherein: a substantially rhombic notched hole is formed at the damper steel plate; and one of a pair of diagonal lines of the rhombic shape is parallel to the first direction and the other thereof is parallel to the second direction.

6. The metal joint according to claim 1, wherein: one or more slits, which pass through the damper steel plate and extend in the second direction, are formed at the damper steel plate; the length of a divided steel plate portion, which is obtained by dividing the damper steel plate by the slits, is set so that the bending yield of both ends in the second direction occurs when the shear strength is increased.

7. The metal joint according to claim 1, wherein: the damper steel plate is formed of at least one of a steel member having a yield strength ratio where yield strength is equal to or higher than 2/3 of a maximum strength, and a steel member having a yield strength range where yield strength is within ±20% of a design yield strength.

8. The metal joint according to claim 1, wherein precipitation hardening is performed on the damper steel plate so that the damper steel plate satisfies at least one of a predetermined yield strength ratio and a predetermined yield strength range.

9. The metal joint according to claim 1, wherein: the damper steel plate is formed of a steel plate on which plastic working is performed, and the plastic working is to previously deform the steel plate from an initial position in the first direction by a predetermined amount of deformation, and to make the steel plate, where the yield has occurred, return to the initial position; and at least one of a yield strength ratio and a yield strength range of the damper steel plate is set to a predetermined value by the plastic working.

10. A building including a metal joint provided with a damping member that is mounted at a wall leg of a bearing wall installed on a building foundation and yields in response to rocking of the bearing wall and exerts a damping effect, wherein
- the metal joint includes a first connecting part connected to an anchor member that is fixed to the building foundation and extends upward in a vertical direction, second connecting parts that are connected to the bearing wall, and the damping member that connects between the first connecting part and the second connecting parts;
- the first connecting part comprises a cylindrical steel member into which the anchor member is inserted;
- the second connecting parts comprise a pair of connecting steel plates which face each other with the first connecting part interposed therebetween and the connecting steel plates are disposed so as to face each other with the anchor member interposed therebetween;
- the damping member is disposed substantially symmetrically with respect to an axis of the anchor member and comprises a damper steel plate that connects between the connecting steel plates and the cylindrical steel member;
- the damper steel plate is joined to the cylindrical steel member so as to extend from a peripheral surface of the cylindrical steel member in a tangential direction of the cylindrical steel member and the damper steel plate is disposed between each of the connecting steel plates and the cylindrical steel member;
- one edge and an other edge of the connecting steel plates are connected to each other by a first reinforcing steel member and a second reinforcing steel member, respectively;
- the anchor member inserted into the cylindrical steel member is fixed to both ends of the cylindrical steel member through a nut; and
- wherein when the rocking of the bearing wall occurs, the damping member is deformed and yields in accordance with a relative displacement between the second connecting parts that are moved together with the bearing wall and the first connecting part of which a movement is restricted by the anchor member, thereby exerting the damping effect.

11. The building including a metal joint according to claim 10, wherein: the damper steel plate comprises two damper steel plates which face each other so as to be substantially parallel to each other.

12. The building including a metal joint according to claim 10, wherein: an insertion hole into which the anchor member is inserted is formed in at least one of the first and second reinforcing steel members.

13. The building including a metal joint according to claim 10, wherein: the bearing wall includes, at least, a pair of frame members that are positioned at side edges of the bearing wall, and a face member that is fixed between the frame members; each of the frame members has a hollow cross section that has a pair of opposite faces facing each other; and the second connecting part is connected to each of the opposite faces.

14. The building including a metal joint according to claim 13, wherein the building is a steel house where each of the frame members is made of light-gauge steel.

* * * * *

UNITED STATES PATENT AND TRADEMARK OFFICE
CERTIFICATE OF CORRECTION

PATENT NO. : 8,511,025 B2
APPLICATION NO. : 12/735113
DATED : August 20, 2013
INVENTOR(S) : Yoshimichi Kawai et al.

Page 1 of 1

It is certified that error appears in the above-identified patent and that said Letters Patent is hereby corrected as shown below:

In the Specification

Column 6, line 8, change "at at least" to -- at least --;

Column 6, line 20, change "at at least" to -- at least --;

Column 13, line 25, change "webs 13" to -- web 13 --;

Column 26, line 15, change "demotes" to -- denotes --;

In the Claims

Column 29, line 27, change "2. The metal joint according to claim," to -- 2. The metal joint according to claim 1, --.

Signed and Sealed this
Fifth Day of August, 2014

Michelle K. Lee
*Deputy Director of the United States Patent and Trademark Office*

UNITED STATES PATENT AND TRADEMARK OFFICE
CERTIFICATE OF CORRECTION

PATENT NO.       : 8,511,025 B2
APPLICATION NO. : 12/735113
DATED            : August 20, 2013
INVENTOR(S)      : Kawai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 365 days.

Signed and Sealed this
Fifteenth Day of September, 2015

Michelle K. Lee
*Director of the United States Patent and Trademark Office*